(12) United States Patent
Tang et al.

(10) Patent No.: US 12,422,623 B2
(45) Date of Patent: Sep. 23, 2025

(54) TWO-DIMENSIONAL GRATING COUPLER AND METHOD OF FORMING THE SAME

(71) Applicant: TAIWAN SEMICONDUCTOR MANUFACTURING COMPANY LTD., Hsinchu (TW)

(72) Inventors: Cheng-Tse Tang, Hsinchu County (TW); Wei-Kang Liu, Taichung (TW); Hau-Yan Lu, Hsinchu (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 292 days.

(21) Appl. No.: 18/335,118

(22) Filed: Jun. 14, 2023

(65) Prior Publication Data

US 2024/0418941 A1 Dec. 19, 2024

(51) Int. Cl.
*H04B 10/00* (2013.01)
*G02B 6/34* (2006.01)

(52) U.S. Cl.
CPC ..................... *G02B 6/34* (2013.01)

(58) Field of Classification Search
CPC ........... G02B 6/34; G02B 6/305; G02B 6/124
See application file for complete search history.

(56) References Cited

U.S. PATENT DOCUMENTS

| | | | | |
|---|---|---|---|---|
| 5,621,715 A | * | 4/1997 | Ohyama | G11B 7/124 369/103 |
| 6,268,091 B1 | * | 7/2001 | Pierrat | G03F 1/26 430/5 |
| 6,775,427 B2 | * | 8/2004 | Evans | H01S 5/187 372/102 |

(Continued)

FOREIGN PATENT DOCUMENTS

| | | |
|---|---|---|
| CN | 114252956 A | 3/2022 |
| TW | 202248696 A | 12/2022 |

(Continued)

OTHER PUBLICATIONS

U.S. Appl. No. 11/531,173 is the US counterpart of TW 202248696 A.

(Continued)

*Primary Examiner* — Agustin Bello
(74) *Attorney, Agent, or Firm* — WPAT LAW; Anthony King

(57) ABSTRACT

A method of forming a grating coupler includes: providing an initial design layout of the grating coupler, wherein the initial design layout includes: a taper section, comprising a pair of tapers; and a grating section coupled to the taper section, the grating section having an array of gratings, wherein the gratings includes gradually changing shapes, from a top-view perspective, from a first non-convex octagonal shape of a central grating, at a center of the grating section, of one of a second non-convex octagonal shape, a convex octagonal shape, and a quadrilateral shape, to an (Continued)

edge grating near an edge of the grating section. The method further includes: converting the initial design layout into a revised design layout through an optical proximity correction operation; and manufacturing the grating coupler using the revised design layout.

20 Claims, 32 Drawing Sheets

(56) References Cited

U.S. PATENT DOCUMENTS

| | | | | |
|---|---|---|---|---|
| 7,298,945 | B2* | 11/2007 | Gunn, III | G02B 6/2733 |
| | | | | 385/37 |
| 8,676,003 | B2* | 3/2014 | Roelkens | G02B 6/305 |
| | | | | 385/14 |
| 9,091,827 | B2* | 7/2015 | Verslegers | G02B 6/34 |
| 10,365,435 | B1* | 7/2019 | Karimelahi | G02B 6/124 |
| 10,782,479 | B2* | 9/2020 | Bruck | G02B 6/14 |
| 11,002,914 | B2* | 5/2021 | Meade | G02F 1/1393 |
| 11,215,759 | B2* | 1/2022 | Gianesello | G02B 6/2706 |
| 11,520,107 | B2* | 12/2022 | Sun | G02B 6/29332 |
| 11,531,173 | B2* | 12/2022 | Chern | G02B 6/4206 |
| 2003/0235370 | A1* | 12/2003 | Taillaert | B82Y 20/00 |
| | | | | 385/37 |
| 2010/0119229 | A1* | 5/2010 | Roelkens | G02B 6/12007 |
| | | | | 398/79 |
| 2010/0322555 | A1* | 12/2010 | Vermeulen | G02B 6/34 |
| | | | | 385/28 |
| 2011/0103743 | A1* | 5/2011 | Baets | G02B 6/34 |
| | | | | 385/37 |
| 2013/0343704 | A1* | 12/2013 | Doerr | G02B 6/34 |
| | | | | 385/37 |
| 2014/0010498 | A1* | 1/2014 | Verslegers | G02B 6/26 |
| | | | | 385/37 |
| 2016/0238787 | A1* | 8/2016 | Nadovich | G02B 6/1228 |
| 2016/0246009 | A1* | 8/2016 | Jiang | G02B 6/124 |
| 2016/0266316 | A1* | 9/2016 | Wohlfeil | G02B 6/268 |
| 2016/0349449 | A1* | 12/2016 | Verslegers | G02B 6/26 |
| 2017/0168236 | A1* | 6/2017 | Huang | G02B 6/425 |
| 2017/0205581 | A1* | 7/2017 | de Boer | G02B 6/2726 |
| 2018/0095199 | A1* | 4/2018 | Li | G02B 6/1228 |
| 2018/0306977 | A1* | 10/2018 | Bruck | H04B 10/2581 |
| 2018/0306986 | A1* | 10/2018 | Bruck | G02B 6/30 |
| 2019/0170938 | A1* | 6/2019 | Plantier | G02B 6/12007 |
| 2021/0255397 | A1* | 8/2021 | Hao | G02B 6/124 |
| 2022/0214502 | A1* | 7/2022 | Fini | G02B 6/2726 |
| 2022/0245321 | A1* | 8/2022 | Kuo | G02B 27/0012 |
| 2022/0269006 | A1* | 8/2022 | Chern | G02B 6/124 |
| 2022/0276453 | A1* | 9/2022 | Chern | G02B 6/34 |
| 2022/0317379 | A1* | 10/2022 | Shih | G02B 6/34 |
| 2023/0296844 | A1* | 9/2023 | Wang | G02B 6/305 |
| | | | | 385/43 |
| 2024/0411086 | A1* | 12/2024 | Kuo | G02B 6/34 |
| 2024/0418941 | A1* | 12/2024 | Tang | G02B 6/305 |

FOREIGN PATENT DOCUMENTS

| | | |
|---|---|---|
| WO | 2016/093187 A1 | 6/2016 |
| WO | 2016/171115 A1 | 10/2016 |

OTHER PUBLICATIONS

U.S. Appl. No. 11/353,654 is the US counterpart of CN 114252956 A.

* cited by examiner

TWO-DIMENSIONAL GRATING COUPLER AND METHOD OF FORMING THE SAME

BACKGROUND

Modern technology advances, such as big data, cloud computation, cloud storage, and Internet of Things (IoT), have driven exponential growth of various applications in processing and communications of data, e.g., high performance computers, data centers, and long-haul telecommunication. To address the emerging need of high data rate transmission, a modern semiconductor structure may include optical elements for providing optical data links to improve the data transmission rate of existing electrical data links. In the development of incorporating optical data links to the semiconductor device, the challenge of improving the coupling efficiency of the optical data links has attracted a great deal of attention.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
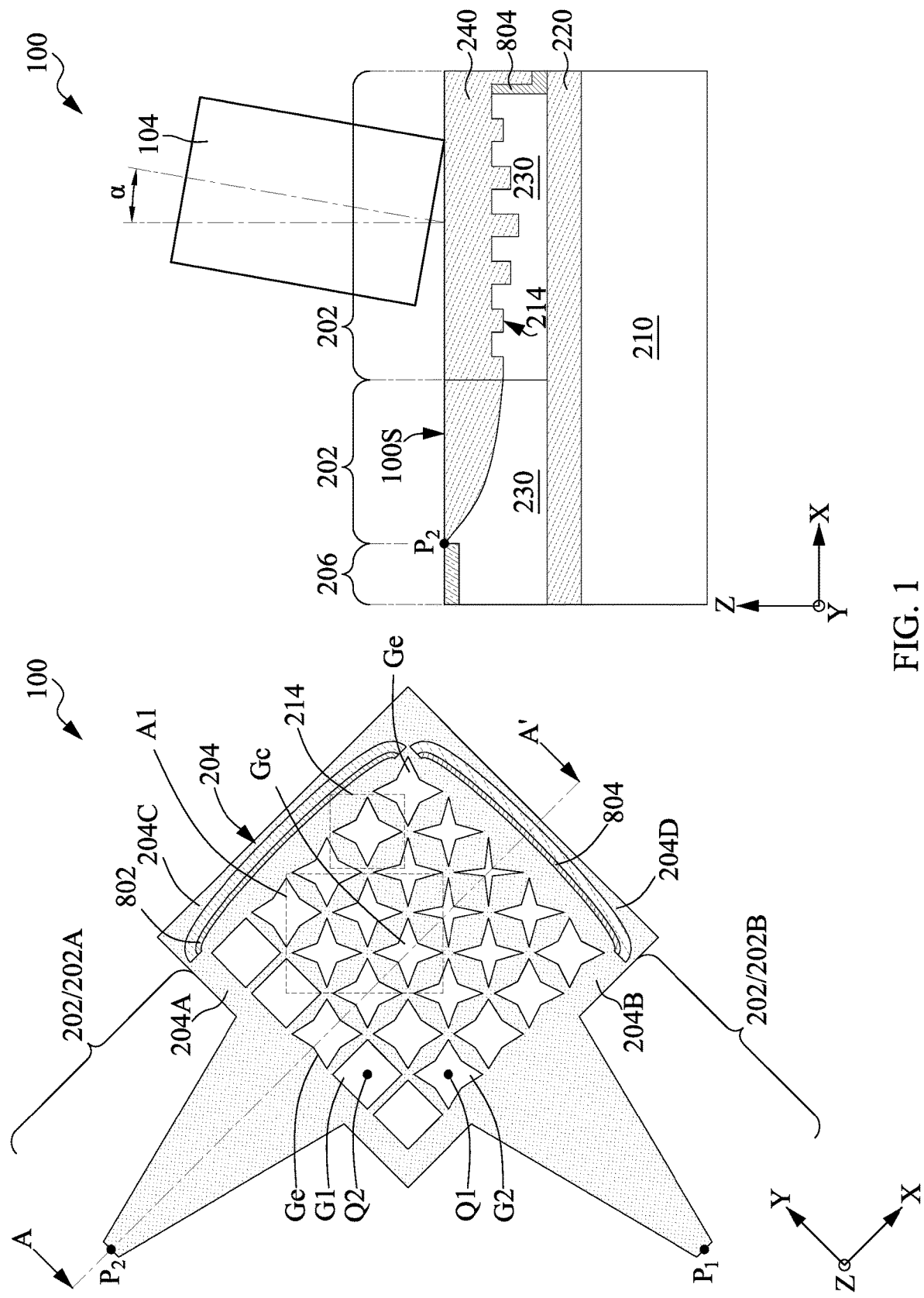
FIG. 1 shows block diagrams of a top view and a cross-sectional view of a grating coupler, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Embodiments of the present disclosure an optical grating coupler and a method of forming the optical grating coupler. Modern optical waveguides and optical grating couplers may be implemented with a silicon-based material due to its low transmission loss and compatibility with existing semiconductor fabrication processes. The grating coupler is useful in an optical transmission/receiving system since it is used to convert the light beam from an optical fiber to an optical waveguide with a difference of light field diameter between optical fiber and the optical waveguide. Further, polarization-dependent loss (PDL) of the grating coupler due to mode mismatch is commonly observed due to design constraints. Therefore, the optical coupling performance of the grating coupler may be compromised by the device size.

The present disclosure proposes a two-dimensional (2D) grating coupler to effectively enhancing the optical coupling performance of the grating coupler. The 2D grating coupler generally includes a taper section and a grating section coupled to the taper section to serve as a composite coupling medium between an optical fiber and an optical waveguide. The proposed grating coupler incorporates one or more design criteria in implementing the apodized grating patterns to improve coupling efficiency of both the transverse electric (TE) and transverse magnetic (TM) modes of the light beam, and lower the polarization-dependent loss (PDL). As a result, the coupling performance of the grating coupler can be enhanced as compared to existing grating couplers.

FIG. 1 shows block diagrams of a top view and a cross-sectional view of a grating coupler 100, in accordance with some embodiments of the present disclosure. The cross-sectional view is taken along the sectional line AA of the top view, in accordance with various embodiments. The grating coupler 100 may be used in coupling a light beam from an optical fiber 104 to a waveguide 206 in a semiconductor device or an integrated chip (IC), or from the waveguide 206 to the optical fiber 104. According to some embodiments of the present disclosure, the grating coupler 100 is formed in the semiconductor device where the waveguide 206 is formed. The grating coupler 100 may be integrated with the waveguide 206. According to some embodiments of the present disclosure, the grating coupler 100 and the waveguide 206 are formed of semiconductor materials, such as bulk silicon. According to some embodiments of the present disclosure, a lower silicon layer 210 is provided as a base layer in a semiconductor substrate or semiconductor wafer of silicon. Further, an insulating layer 220 is formed over the lower silicon layer 210. The insulating layer 220 may be formed of a dielectric material, such as silicon dioxide. An upper silicon layer 230 is formed over the insulating layer 220 to serve as a circuit layer where devices can be formed. According to some embodiments of the present disclosure, the upper silicon layer 230 is formed on the insulating layer 220 by epitaxy to provide better performance. The composite structure of the lower silicon layer 210, the insulating layer 220 and the upper silicon layer 230 may be collectively referred to as a silicon-on-insulator (SOI) substrate, where the insulating layer 220 serves as an electrical insulating layer between the lower silicon layer 210 and the upper silicon layer 230.

According to some embodiments of the present disclosure, most of the semiconductor devices or optical devices, e.g., the grating coupler 100, are formed in the upper silicon layer 230, and a cladding layer 240 is formed over the upper silicon layer 230. The cladding layer 240 may be formed of an insulating dielectric material with a refractive index less than silicon, e.g., silicon oxide. The cladding layer 240 and the insulating layer 220 may altogether form a cladding structure to wrap around the grating coupler 100 such that the light beam in the grating coupler 100 can propagate in compliance with the law of total internal reflection.

Referring to the top view and the cross-sectional view of the grating coupler 100 shown in FIG. 1, the grating coupler 100 includes a taper section 202 and a grating section 204, where the taper section 202 and the grating section 204 are coupled to each other. According to some embodiments, the grating coupler 204 has a quadrilateral shape with four sides 204A, 204B, 204C and 204D. The grating coupler 204 may be coupled to the tapper section 202 at the sides 204A and 204B, and the sides 204C and 204D face away from an interface between the taper section 202 and the grating coupler 204. The taper section 202 and the grating section 204 may be formed in the same layer, such as the upper silicon layer 230.

According to some embodiments, the grating section 204 is configured to be optically coupled to an optical fiber 104. According to some embodiments, the taper section 202 is configured to be optically coupled to another optical device formed in the semiconductor device, e.g., the optical waveguide 206. The optical fiber 104 may be arranged proximal to the upper surface 100S of the grating coupler 100. The longitudinal axis of the optical fiber 104 may be arranged to be orthogonal to the surface of the grating coupler 100, or a tilt angle α is formed between the longitudinal axis of the optical fiber 104 and the normal line of the upper surface 100S of the grating coupler 100. The tilt angle α may be less than ten degrees, e.g., about eight degrees. The tilt angle α may facilitate a majority of the light beam to propagate toward the waveguide 206. Further, through the arrangement of the grating coupler 100, the light beam propagating in the optical waveguide 206 may be optically coupled to or from the optical fiber 104 with higher optical coupling efficiency through matching of the mode field diameters between the optical waveguide 206 and the optical fiber 104.

According to some embodiments, the taper section 202 includes a first taper 202A and a second section 202B. The tapers 202A and 202B may extend in different directions. The longitudinal axes of the tapers 202A and 202B may intersect at a central point of the grating section 204. According to some embodiments, the tapers 202A and 202B may form an included angle of substantially 90 degrees or other degrees. The tapers 202A and 202B are arranged to be tapered from a first end (see label 502 shown in FIG. 5A) proximal to the sides 204A, 204B of grating section 204 to a second end (see label 504 shown in FIG. 5A) proximal to the optical fiber 206 for achieving optical coupling with the optical waveguide 206.

Figure 2:
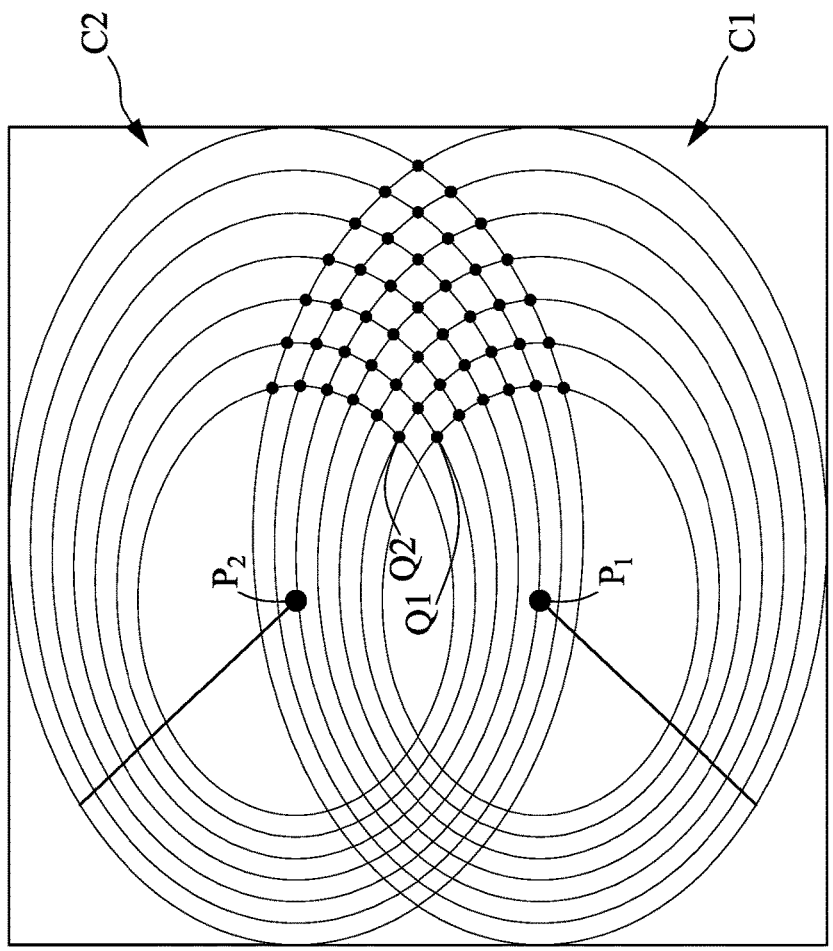
FIG. 2 is a schematic diagram of a location map of gratings of the grating coupler shown in FIG. 1 from a top-view perspective, in accordance with some embodiments of the present disclosure.

FIG. 2 is a schematic diagram of a location map 200 of grating units, or simply gratings, 214 of the grating coupler 204 shown in FIG. 1 from a top-view perspective, in accordance with some embodiments of the present disclosure. Referring to FIGS. 1 and 2, two sets of concentric ellipses C1 and C2 are provided to be intersecting each other, where each of the two sets of the concentric ellipses C1 or C2 have a plurality of ellipses with a common focal point P1 or P2, respectively. These two sets of ellipses C1, C2 are formed to comply with the law of optical refraction of the light beam transmitted from the optical fiber 104. Further, the locations of the focal points P1 and P2 are determined to be coincide with the second ends of the tapers 202B and 202A, respectively, to achieve the optimal focusing of the light beam. The locations of the intersecting locations Qi (i being the index of the gratings 214), of the two sets of ellipses C1, C2 determine the centers of the gratings 214 or Gi (i being the index of the gratings 214). For example, two representative gratings G1 and G2 are arranged near the interface between the grating section 204 and the taper section 202, and two representative crossing points or intersecting points Q1 and Q2 are determined according to the location map 200 shown in FIG. 2 and to be coincided with the (geometric) centers of the gratings G1 and G2, respectively. According to some embodiments, the majority of the light beam energy propagating through the optical fiber 104 are covered by the area occupied by the array of crossing points Qi of the concentric ellipses to capture the majority of light beam energy. The dimensions and pitches of the gratings 214 determine the duty cycles and pitches of the gratings 214, and are associated with the refractive indices of the materials of the grating coupler 100 and the wavelength of the light beam. The concentric ellipses C1, C2 may be alternatively formed by concentric circles or other suitable curves.

Referring to FIG. 1, according to some embodiments, the grating section 204 includes a plurality of gratings 214 arranged in an array on the surface of the upper silicon layer 230. According to some embodiments, the gratings 214 are similar to each other in shape but with some extent of variations. The gratings 214 are arranged with gradually changing shapes and/or areas from the gratings Gc at a central location of the grating section 204 toward an edge grating Ge close to the edges, e.g., the sides 204A through 204D of the grating section 204, i.e., a process referred to herein as apodization. Through apodization of the gratings 214, the overall optical coupling efficiency and quality of the light beam refracted through the gratings 214 can be improved.

Figure 3A:
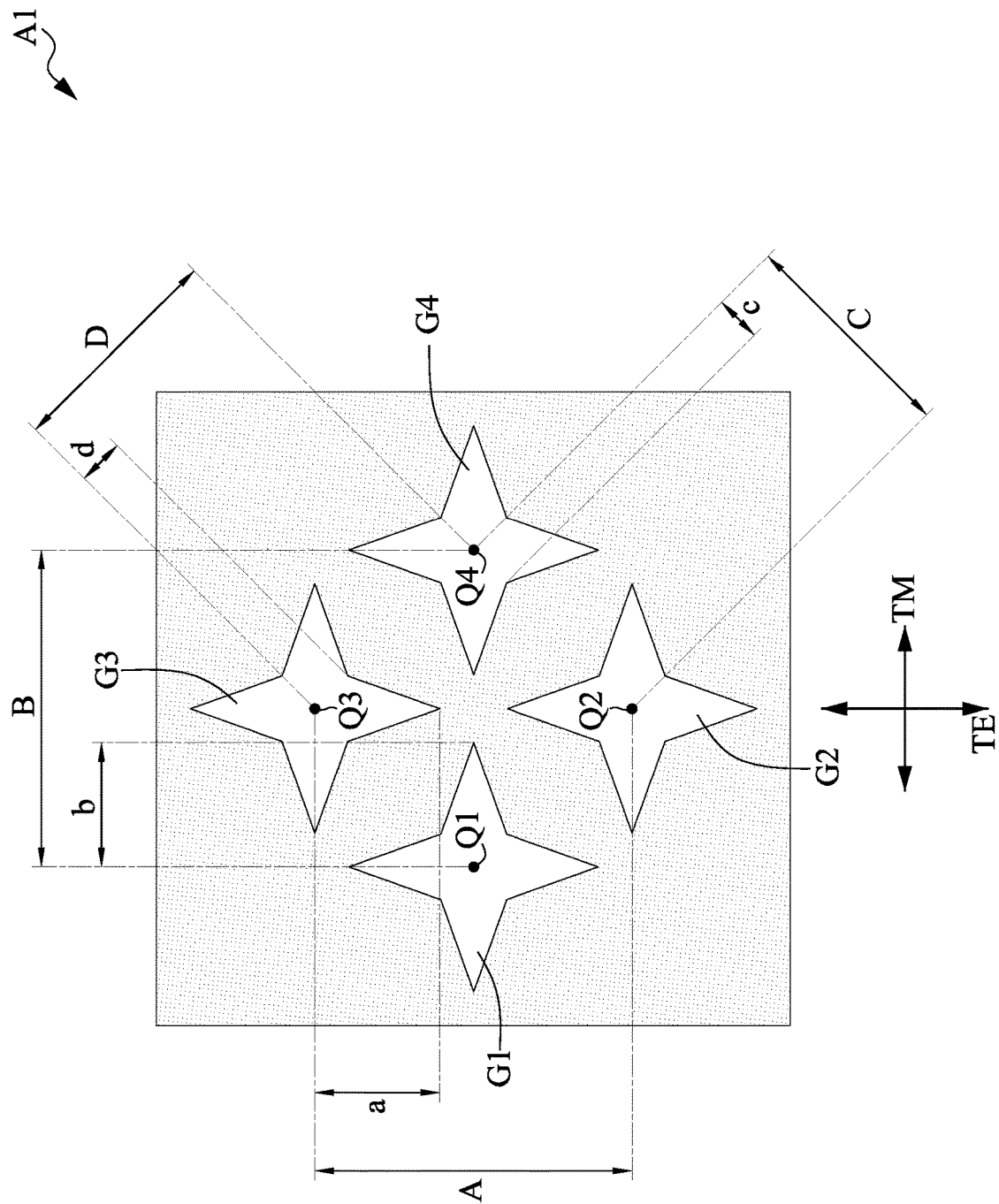
FIG. 3A shows an enlarged view of a portion of a grating section of the grating coupler shown in FIG. 1, in accordance with some embodiments of the present disclosure.

FIG. 3A shows an enlarged view of a portion A1 of the grating section 204 of the grating coupler 100 shown in FIG. 1, in accordance with some embodiments of the present disclosure. Four representative gratings 214, e.g., G1, G2, G3 and G4 with respective apodized arrangements are illustrated in the portion A1. Each of the gratings 214 has its respective center Q1, Q2, Q3 and Q4, whose location is determined according to the location map 200, as discussed with reference to FIG. 2. Each of the gratings 214 has a similar shape to its adjacent gratings 214. According to some embodiments, the grating 214, especially the grating 214 at the center of the grating section 204, includes a non-convex octagonal shape, e.g., a four-sliced star shape. The term 'non-convex' of a shape refers to at least one interior angle of that shape has a measure between 180° and 360°, or equivalently is referred to as a reflex angle. The star shape may characterized by four slices or protrusions radiating from its body or center with four tips, and each of the four slices or protrusions is tapered from the center of the star shape to a tip of the respective slices or protrusions. Therefore, the non-convex octagonal shape may include four reflex interior angles formed between two adjacent slices. According to some embodiments, the non-convex octagonal shape also has four acute interior angles at the respective four slices. According to some embodiments, the grating Gc gas a non-convex octagonal shape symmetric about its geometric center.

The arrangement of the gratings 214 is formed at least by a first ratio D11, where the first ratio D11 is referred to as a first duty cycle of the gratings 214 and formed by 2*a/A. The first dimension 'a' denotes a first length of the slices measured from the center Qi to a tip of the slice along a first axis, e.g., the Y-axis. The second dimension 'A' denotes a first distance of the gratings 214 measured between centers Qi of two adjacent gratings 214 along the first axis. The arrangement of the gratings 214 is further characterized at least by a second ratio D12, where the second ratio D12 is referred to as a second duty cycle of the gratings 214 and formed by 2*b/B. The third dimension 'b' denotes a second length of the slices measured from the center Qi to a tip of the slice along a second axis, e.g., the X-axis. The fourth dimension 'B' denotes a second distance of the gratings 214 measured between centers Qi of two adjacent gratings 214 along the second axis.

The arrangement of the gratings 214 is further characterized by a third ratio D21, where the third ratio D21 is referred to as a first pitch of the gratings 214 and formed as 2*c/C. The fifth dimension 'c' denotes a third length of the grating 214 measured from the center Qi to a vertex connecting two adjacent slices along a first diagonal axis W1. The sixth dimension 'C' denotes a third distance between centers of adjacent gratings 214 along the first diagonal axis W1. The first diagonal axis W1 may include an included angle of 45° or 135° with the first axis, e.g., Y-axis, or the second axis, e.g., X-axis. The arrangement of the gratings 214 is yet further characterized by a fourth ratio D22, where the fourth ratio D22 is referred to as a second pitch of the gratings 214 and formed as 2*d/D. The seventh dimension 'c' denotes a fourth length of the grating 214 measured from the center Qi to a vertex connecting two adjacent slices along a second diagonal axis W2. The second diagonal axis W2 may be orthogonal to the first diagonal axis W1. The eighth dimension 'D' denotes a fourth distance between centers of adjacent gratings 214 along the second diagonal axis W2. The second diagonal axis W2 may include an included angle of 45° or 135° with the first axis, e.g., Y-axis, or the second axis, e.g., X-axis.

A light beam or a transverse electromagnetic wave generally propagates with two polarizations (also referred to components or modes), i.e., the transverse electric (TE) mode and the transverse magnetic (TM) mode. The light or electromagnetic wave components in both the TE mode and the TM mode constitute the transverse electromagnetic wave, in which the TE mode and the TM mode are perpendicular to each other. Therefore, a single-polarization grating, e.g., a bar-shaped or line-shaped grating, may have optical coupling for only one of the TE and TM modes. The energy of the other mode would be easily lost during the optical coupling process. The dual-mode optical coupling is capable of collecting all of the light energy through the dual polarizations, but in real implementations it may suffer performance degradation not only in the coupling efficiency but also polarization-dependent loss (PDL). The PDL may result from at least the tilt angle α of the optical fiber 104 with respect to the upper surface 100S of the grating coupler. As such, in order to achieve desirable optical coupling efficiency while maintaining low PDL, the dual-polarization gratings 214 may need to be configured with caution for capturing as most energy of the refracted light beam as possible while reducing the PDL to an acceptable level.

According to some embodiments, the gratings 214 located in different crossing points Qi of the location map 200 include individual first duty cycles D11, second duty cycles D12, first pitches D21, and second pitches D22 to implement the apodized gratings 214 in the grating section 204. According to some embodiments, the first duty cycles D11, second duty cycles D12, first pitches D21, and second pitches D22 of each gratings 214 and each pair of gratings 214 are tunable according to the incident light energy where such gratings 214 are received. The tuning of the first duty cycles D11, second duty cycles D12, first pitches D21, and second pitches D22 should achieve the goal of matching the energy distribution of the light beam across the array of the gratings 214 in an attempt to maximize the optical coupling efficiency, while maintaining the equality between the components of the light beam on the TE polarization and the TM polarization in an attempt to minimize the PDL. The greater the incident light energy is received, the greater the first duty cycles D11, second duty cycles D12, first pitches D21, and second pitches D22 of the gratings 214 may be. According to some embodiments, the grater the incident light energy is received, the greater surface areas of the gratings 214 may be. According to some embodiments, the tuning of the first duty cycles D11, second duty cycles D12, first pitches D21, and second pitches D22 of a target grating 214 depends on the factors including: the received light beam energy, the distance between the target grating 214 and the central grating 214, the distance between the target grating 214 and the taper 202A or 202B, the wavelength of the light beam, the refractive indices of the materials, e.g., silicon and silicon oxide, of the grating coupler 100, and the like.

According to some embodiments, referring to FIG. 1, the trend of apodization, e.g., the increase or decrease of the dimensions 'a,' 'b,' 'c' and 'd,' and pitches 'A,' 'B,' 'C' and 'D,' of the gratings 214 are the same or symmetrical with respect to a central grating Gc. For example, a subset of the gratings 214 may have substantially equal lengths 'a,' 'b,' 'c' or 'd,' in which each of the subset of the gratings 214 are separated from the central grating Gc by a substantially equal distance. The lengths 'a,' 'b,' 'c' or 'd,' may be monotonically decreased or increased from the central grating Gc and toward the edge of the grating array in a manner of concentric circles. In other words, the areas of the gratings 214 may gradually change, e.g., increase or decrease, from the central grating Gc to an edge grating 214 near the edge of the grating section 204. Similarly, a subset of adjacent grating pairs out of the gratings 214 may have substantially equal first pitches 'A,' 'B,' 'C' or 'D,' in which a center of each of the grating pairs of the gratings 214 are separated from the central grating Gc by a substantially equal distance. The pitches 'A,' 'B,' 'C' or 'D,' may be monotonically decreased or increased from the central grating Gc and toward the edge of the grating array in a manner of concentric circles.

Through the adjustment of apodization throughout all gratings 214 of the grating section 204, the gratings 214 in each location of the location map 200 shown in FIG. 2B can adapt to the subtle differences in energy distribution and profile of the light beam, either in the TE polarization or the TM polarization propagated through each of the apodized gratings 214, the optical coupling efficiency for each of the TE mode and TM mode can be further increased, while the PDL can be reduced. Each of the two polarizations, i.e., the TE mode and TM mode, of the light beam is transmitted through the tapers 202A and 202B, respectively, or vice versa. According to some embodiments, the lengths 'a,' 'b,' 'c' or 'd' or the distances 'A,' 'B,' 'C,' or 'D' determined in the design layout of the grating coupler 100 may include process-induced variations or errors in a fabricated grating coupler 100. Such process-induced variations or errors may be present due to practical limit of the manufacturing tools, e.g., the fidelity limit of the exposure tool or the etching tool. The process-induced variation or error of the layouts of the gratings 214 may be at least partially compensated for by, e.g., the optical proximity correction (OPC); however, the ideal shape of the gratings 214, e.g., the angled tip of the slices or the vertices between the adjacent slices may be rounded.

Figure 3B:
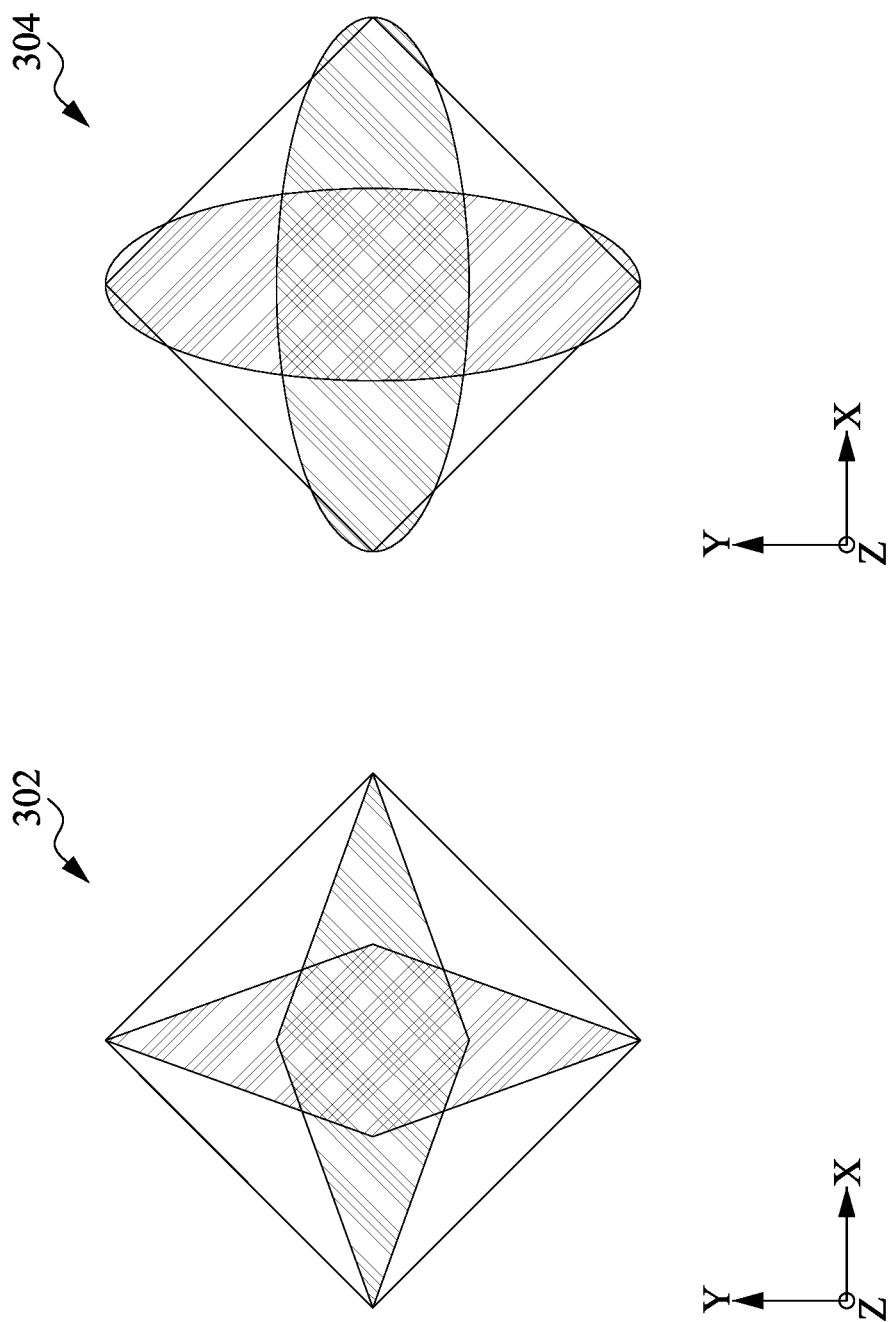
FIG. 3B shows top views of various gratings of the grating coupler shown in FIG. 1, in accordance with some embodiments of the present disclosure.

FIG. 3B shows top views of various gratings 302 and 304 of the grating coupler 100 shown in FIG. 1, in accordance with some embodiments of the present disclosure. Referring to a left subfigure of FIG. 3B, the grating 302 can be viewed as a combination of two diamonds or rhombuses, in which the two diamonds are oriented in different orientations, e.g., one is oriented in the direction of X-axis, while the other is oriented in the direction of Y-axis. The two diamonds cross to each other and their centers are overlapped with each other to the form the gratings 302. According to some embodiments, the shape of grating 302 is formed of straight lines and sharp vertices and can be seen as an ideal version of the gratings 214 of FIG. 1 and FIG. 2. Such layout of the grating 302 may be fabricated with an advanced photolithography tools and/or etching tools. According to some embodiments, the grating 302 shown in the left subfigure of FIG. 3B is a layout with desirable OPC operations before photolithography and etching operations.

Referring to a right subfigure of FIG. 3B, the grating 304 can be viewed as a combination of two ellipses or ovals, in which the two ellipses are oriented in different orientations, e.g., one is oriented in the direction of X-axis, while the other is oriented in the direction of Y-axis. The two ellipses cross to each other and their centers are overlapped with each other to the form the gratings 214. According to some embodiments, the effect of the grating 304 may be similar to that of the grating 214 but with curved sides and round vertices. The layout of the grating 304 can be seen as a fabricated version of the grating 214 since the layout of the grating 304 is more friendly to the manufacturing process of the grating 304 and is limited to the process constraints of the currently available photolithography and etching tools. According to some embodiments, the better result the OPC operation can render, the closer the layout of the grating 304 will be to the grating 214.

According to some embodiments, a ratio the length difference or the pitch difference determined by the apodization arrangement to the process-induced dimension error is at least five times, such as between about five times and about 1000 times, between about between about ten times and about 500 times, or between about ten times and about 100 times.

FIGS. 4A, 4B, 4C, 4D, 4E, 4F and 4G are top views of gratings 214 in different locations of the grating section 204 shown in FIG. 1, in accordance with some embodiments of the present disclosure. As discussed previously with reference to FIG. 3A, the shapes of the gratings 214 will gradually change from the shape, e.g., the shape shown in the left subfigure of FIG. 3A, of the central grating Gc, to apodized shapes. For the sake of clear illustration of the apodized shapes shown in FIGS. 4A through 4G, the labels of the lengths 'a,' 'b,' 'c' and 'd' and the pitches 'A,' 'B,' 'C' and 'D' shown in FIG. 3A are omitted from FIGS. 4A through 4G.

Figure 4B:
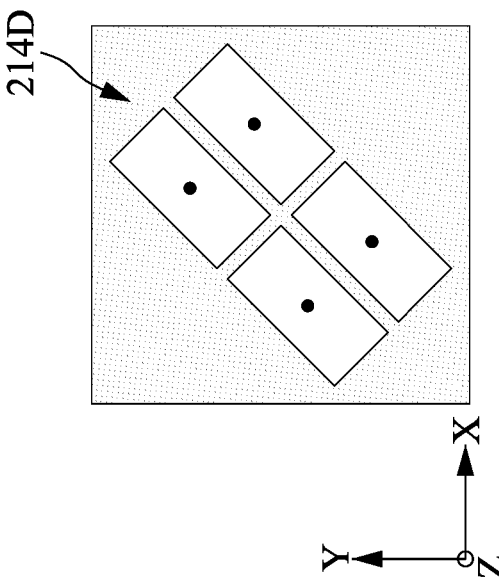
FIGS. 4A, 4B, 4C, 4D, 4E, 4F and 4G are top views of gratings in different locations of the grating section shown in FIG. 1, in accordance with some embodiments of the present disclosure.
Figure 4D:
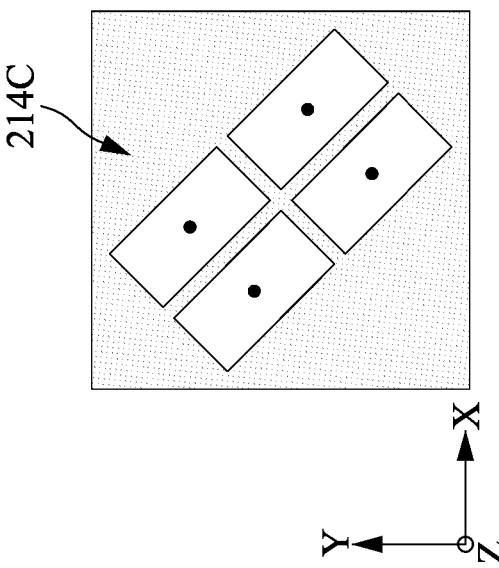
Figure 4A:
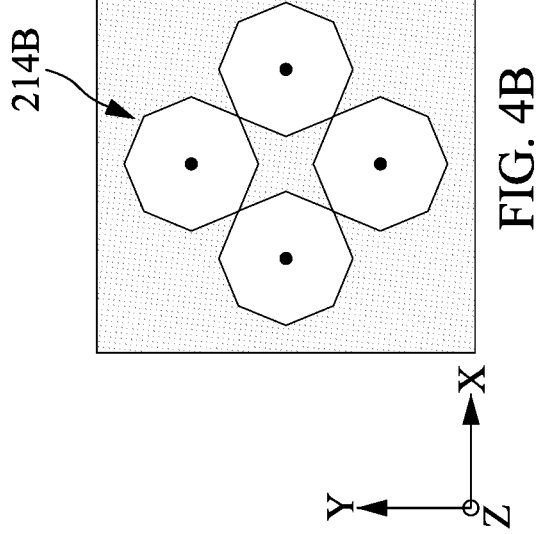

Referring to FIG. 4A, the shapes of gratings 214A are apodized from a star shape or non-convex octagonal shape to a quadrilateral shape, e.g., a square shape. In that case, the lengths 'a' and 'b' of each grating 214A are substantially equal, and the lengths 'c' and 'd' of each grating 214A are substantially equal and less than the lengths 'a' and 'b.' A ratio between the lengths 'a' and 'b' of each grating 214A is substantially equal to $\sqrt{2}$, and the vertices of each grating 214A have an angle substantially equal to 90°.

Referring to FIG. 4B, the shapes of gratings 214B are apodized from a star shape or non-convex octagonal shape to a convex octagonal shape, e.g., a square shape. In that case, the lengths 'a' and 'b' of each grating 214B are substantially equal, and the lengths 'c' and 'd' of each grating 214B are substantially equal and equal to the lengths 'a' and 'b.' A ratio between the lengths 'a' and 'c' of each grating 214B is substantially equal to one, and the vertices of each grating 214B have an angle substantially equal to 135°.

Figure 4C:
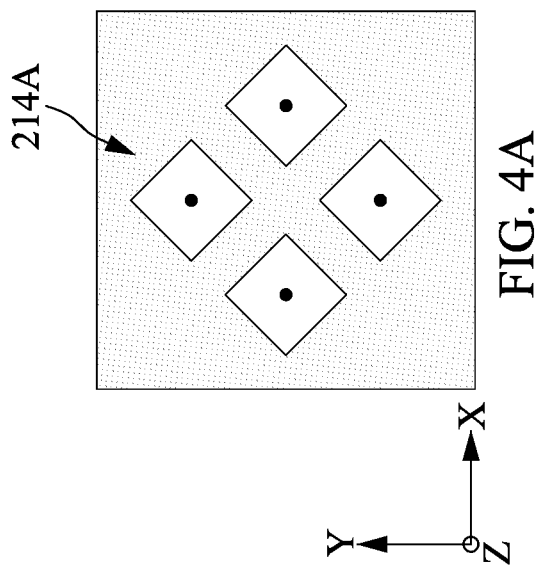

Referring to FIG. 4C, the shapes of gratings 214C are apodized from a star shape or non-convex octagonal shape to a rectangular shape. In that case, the lengths 'a' and 'b' of each grating 214C are unequal, and the lengths 'c' and 'd' of each grating 214C are unequal. The length 'a' may be greater than the length 'c' and 'd,' and the length 'd' may be greater than the length 'c.' The vertices of each grating 214C have an angle substantially equal to 90°.

Referring to FIG. 4D, the shapes of gratings 214D are apodized from a star shape or non-convex octagonal shape to a rectangular shape. In that case, the lengths 'a' and 'b' of each grating 214D are unequal, and the lengths 'c' and 'd' of each grating 214D are unequal. Different from the apodized gratings 214C, in the gratings 214D the length 'c' may be greater than the length 'a.' and the length 'c' may be greater than the length 'd.' The vertices of each grating 214D have an angle substantially equal to 90°.

Figure 4G:
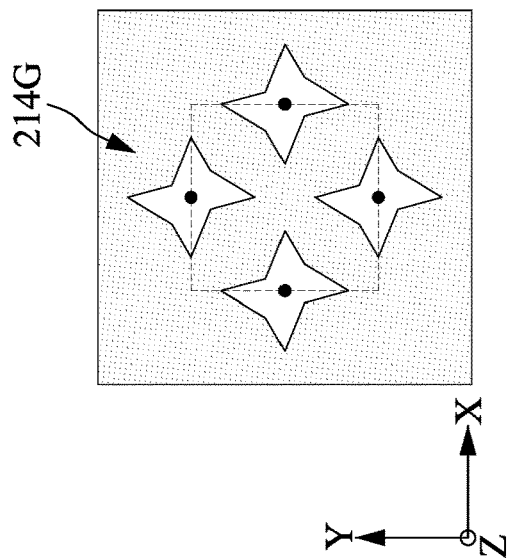
Figure 4F:
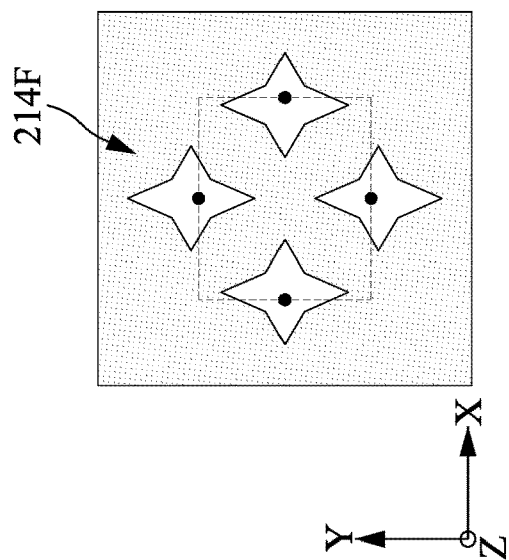
Figure 4E:
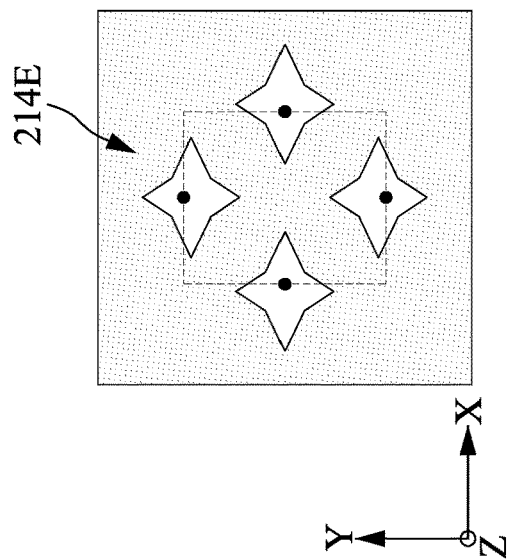

Referring to FIG. 4E, the shapes of gratings 214E are maintained as the star shape or non-convex octagonal shape. However, different from the gratings 214 shown in FIG. 3A, in which the lengths 'a' and 'b' of each grating 214 are substantially equal, and the lengths 'c' and 'd' of each grating 214 are substantially equal, the lengths 'a' and 'b' of each grating 214E may be equal or unequal, and the lengths 'c' and 'd' of each grating 214E may be equal or unequal. The length 'b' in each grating 214E may be greater than the length 'a' of the same grating 214E. According to some embodiments, the lengths 'a' within the same grating 214E measured on two sides of the respective center Qi may also be different from each other. Further, the lengths 'a' on one side of the center Qi and closer to the center Qi may be greater than the lengths 'a' on the other side of the center Qi and more distal to the center Qi. According to some embodiments, the distance between the geometric centers of the upper and lower gratings 214E is less than the first distance 'A' between the upper and lower gratings 214E. According to some embodiments, the distance between the geometric centers of the left and right gratings 214E is greater than the second distance 'B' between the left and right gratings 214E. According to some embodiments, the centers Qi of the upper and lower gratings 214E are offset from their respective geometric centers and farther away from the center (middle point) of the upper and lower gratings 214E. The centers Qi of the left and right gratings 214E are offset from their respective geometric centers and closer to the center (middle point) of the left and right gratings 214E. The vertices of each grating 214E have an acute angle.

Referring to FIG. 4F, the shapes of gratings 214F are maintained as the star shape or non-convex octagonal shape and are similar to the gratings 214E. The lengths 'a' and 'b' of each grating 214F may be equal or unequal, and the lengths 'c' and 'd' of each grating 214F may be equal or unequal. The length 'a' in each grating 214F may be greater than the length 'b' of the same grating 214F. According to some embodiments, the lengths 'a' within the same grating 214E measured on two sides of the respective center Qi may also be different from each other. Further, the lengths 'a' on one side of the center Qi and closer to the center Qi may be less than the lengths 'a' on the other side of the center Qi and more distal to the center Qi. According to some embodiments, the distance between the geometric centers of the upper and lower gratings 214F is greater than the first distance 'A' between the upper and lower gratings 214F. According to some embodiments, the distance between the geometric centers of the left and right gratings 214F is less than the second distance 'B' between the left and right gratings 214F. According to some embodiments, the centers Qi of the upper and lower gratings 214F are offset from their respective geometric centers and closer to the center (middle point) of the upper and lower gratings 214F. The centers Qi of the left and right gratings 214F are offset from their respective geometric centers and farther away from the center (middle point) of the left and right gratings 214E. The vertices of each grating 214F have an acute angle.

According to some embodiments, the gratings 214E and 214F are configured such that the crossing points Qi of the location map 200 for each grating 214E or 214F is not coincided with the crossing point of the lines measuring the lengths 'a' and 'b.' In other words, the crossing points Qi of the grating 214E or 214F are offset from the geometrical center of the respective gratings 214E, 214F by a distance.

Referring to FIG. 4G, the shapes of gratings 214G are maintained as the star shape or non-convex octagonal shape and similar to the gratings 214E and 214F. However, different from the gratings 214E and 214F, the lengths 'a' and 'b' of each grating 214G may be equal or unequal, and the lengths 'c' and 'd' of each grating 214 maybe equal or unequal. The vertices of each grating 214G have an acute angle. The gratings 214G are configured such that the crossing points Qi of the location map 200 for each grating 214G is still coincided with the crossing point of the lines measuring the lengths 'a' and 'b.' In other words, the crossing points Qi of the grating 214G are not offset from the geometrical center of the respective gratings 214G.

Referring to FIG. 1, the top views of the gratings 214 are shown with one combination of apodized gratings 214. For example, the gratings 214 close to the interface between the grating section 204 and the taper section 202 or close to the sides 204A, and 204B adopt shapes of the gratings 214A, 214B, 214C, or 214D, e.g., in quadrilateral shapes or convex octagonal shapes, while the gratings 214 close to the sides 204C and 204D of the grating section 204 opposite to the taper section 202 adopt the shapes of the gratings 214E, 214F or 214G. However, the layout of the gratings 214 in the grating section 204 shown in FIG. 1 is only shown for illustrative purposes. Other combinations of the apodized gratings 214A through 214G are also within the contemplated scope of the present disclosure.

According to some embodiments, a difference degree in a shape, an area and a thickness between a central grating Gc of the gratings 214 and a target grating 214 is determined according to a distance between the central grating Gc and the target grating 214. According to some embodiments, the gratings 214 include gradually decreased surface areas and thicknesses/depths from a central grating Gc to an edge grating Ge. According to some embodiments, an area ratio between an area sum of all the gratings 214 and an area of the grating section 204 is greater than about 60% or about 70%, e.g., in a range between about 75% and about 85%, to ensure high optical coupling efficiency and sufficient pitch margins for adjacent gratings 214.

Figure 5A:
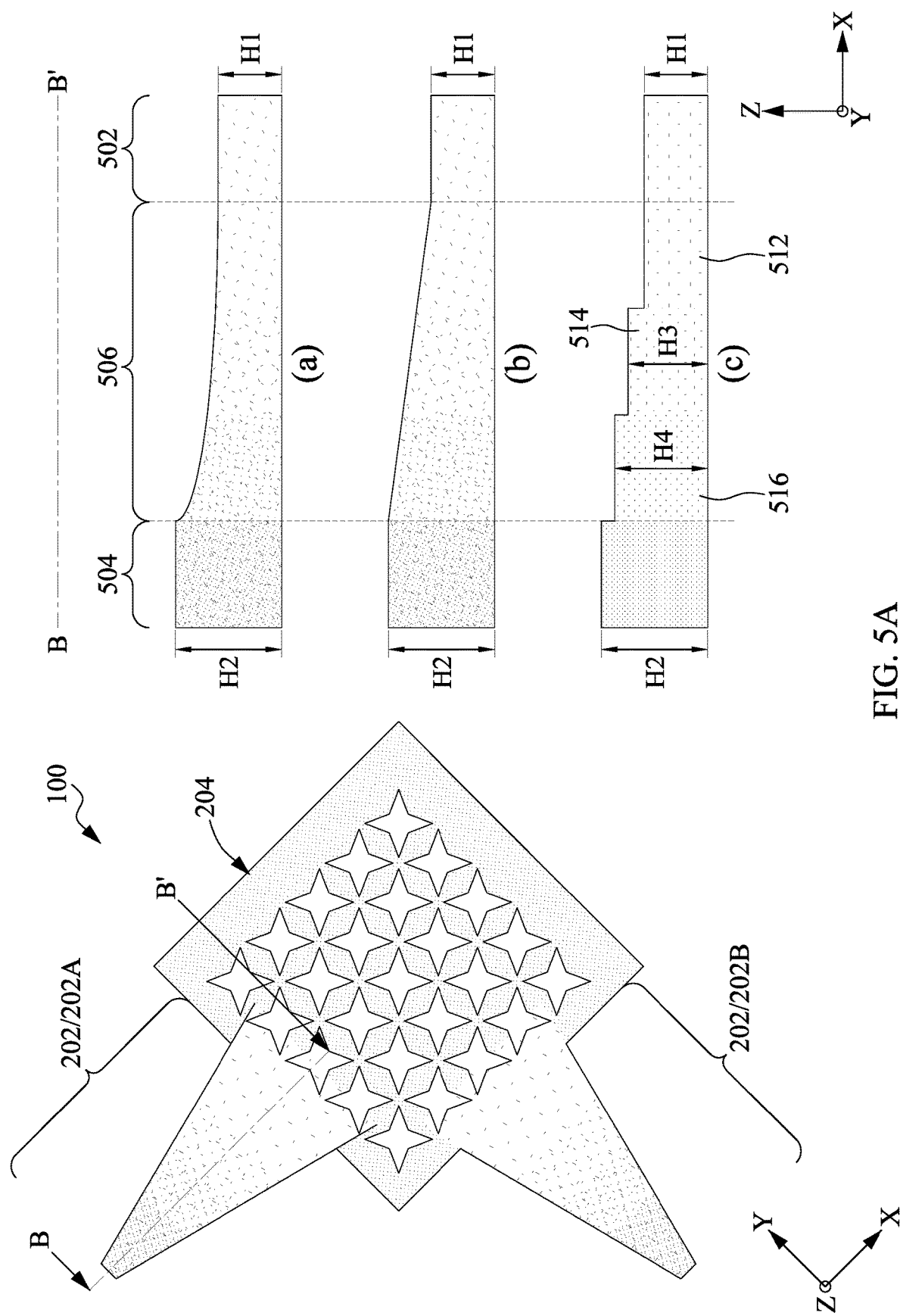
FIG. 5A shows a top view and cross-sectional views of a taper section of a grating coupler, in accordance with some embodiments of the present disclosure.

FIG. 5A shows a top view and cross-sectional views of the taper section 202 of the grating coupler 100, in accordance with some embodiments of the present disclosure. The cross-sectional views are taken along the sectional line BB of the top view, in accordance with various embodiments. Although the cross-sectional view shown in FIG. 5A is only taken from the taper 202A, the configuration discussed below with respect to the taper 202A is also applicable to the taper 202B.

The taper 202A or 202B has two ends, in which a first end 502, which is coupled to the grating section 204 through the side 204A or 204B, has a first height H1 and a second end 504, which is coupled to the waveguide 206, has a second height H2. The first height H2 and the second height H2 greater than the first height H1 are determined for achieving mode matching in the vertical direction. Referring to FIG. 1 and FIG. 5A, the upper surface of the first end 502 may be coplanar with the bottom surface of the gratings 214 of the grating section 204. According to some embodiments, the tapers 202 are tapered from the first end 502 to the second end 504 for achieve optical mode matching along with the increase of the taper height. According to some embodiments, a middle portion 506 of the taper 202A between the first end 502 and the second end 504 increases in height from the first end 502 to the second end 504. The middle portion 506 can have different topography shapes on its upper surface. The first end 502 and the second end 504 of the taper 202A may have a planar or flat shape, while the middle portion 506 of the taper 202A may have a curved shape (shown in subfigure (a)), a slope shape (shown in subfigure (b)), or a stepped shape (shown in subfigure (c)) with intermediate steps 512, 514 and 516. According to some embodiments, the curved shape (a) of the middle portion 506 can achieve better vertical mode transition than the slope shape (b) or the stepped shape (c) due to a smoother height increase. That curved shape, however, may need more complicated (etching) processing operations than the slope shape or the stepped shape. According to some embodiments, the stepped shape of the middle portion 506 has a third height H3 and a fourth height H4 for the steps 514 and 516, respectively, in which the step heights are configured as H1<H3<H4<H2. The step 512 may have a step height H1 substantially equal to that of the first end 502. The stepped shape may use a more simple forming operation; however, the corners formed between adjacent steps may introduce more coupling loss.

Figure 5B:
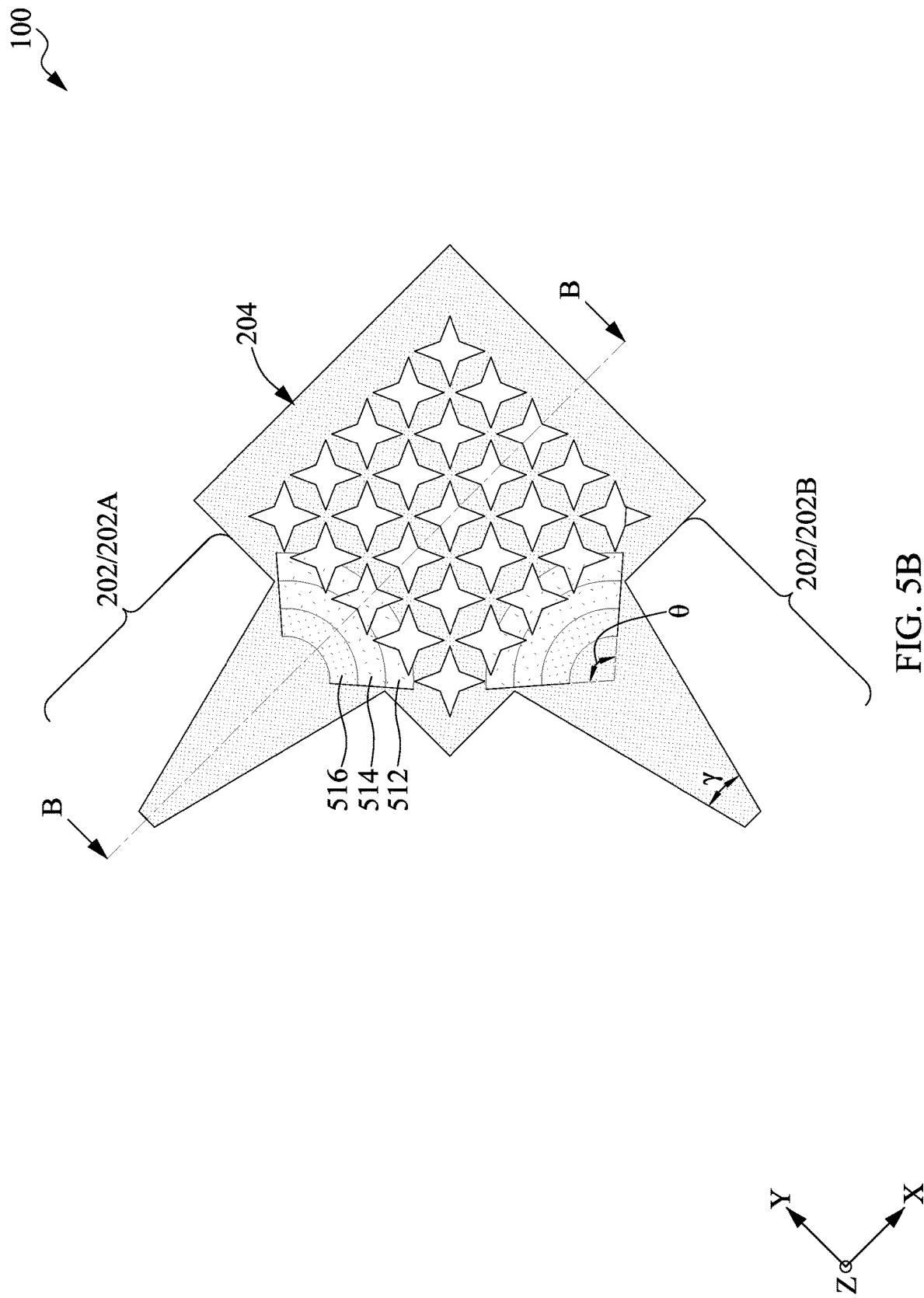
FIG. 5B shows a top view of a taper section of a grating coupler, in accordance with some embodiments of the present disclosure.

FIG. 5B shows a top view of a taper section 202 of the grating coupler 100, in accordance with some embodiments of the present disclosure. The tapers 202A and 202B shown in FIG. 5B are similar to the tapers 202A and 202B shown in the subfigure (c) of FIG. 5A with their upper surfaces having a stepped shape. The difference between the subfigure (c) of FIG. 5A and FIG. 5B lies in that, from a top-view perspective, the sidewalls of intermediate steps 512, 514 and 516 do not flush with the sidewalls of the tapers 202A, 202B. According to some embodiments, the sidewalls of the intermediate steps 512, 514 and 516 are contracted from the first end 502 toward the second end 504. The sidewalls of the intermediate steps 512, 514, 516 may be aligned with each other to form common sidewalls between the sidewalls of the taper 202A or 202B. The extended lines of the contracted common sidewalls of the intermediate steps 512, 514 and 516 may meet and form an angle θ, in which the angle θ may be greater than the included angle γ of the focal point P1, P2 of the tapers 202A, 202B. According to some embodiments, the sidewalls of the intermediate stapes 512, 514, 516 are contracted more than the tapered sidewalls of the tapers 202A, 202B. According to some embodiments, the intermediate stapes 512, 514, 516 have curved sidewalls on sides facing the grating section 204 or the second end 504.

Figure 6:
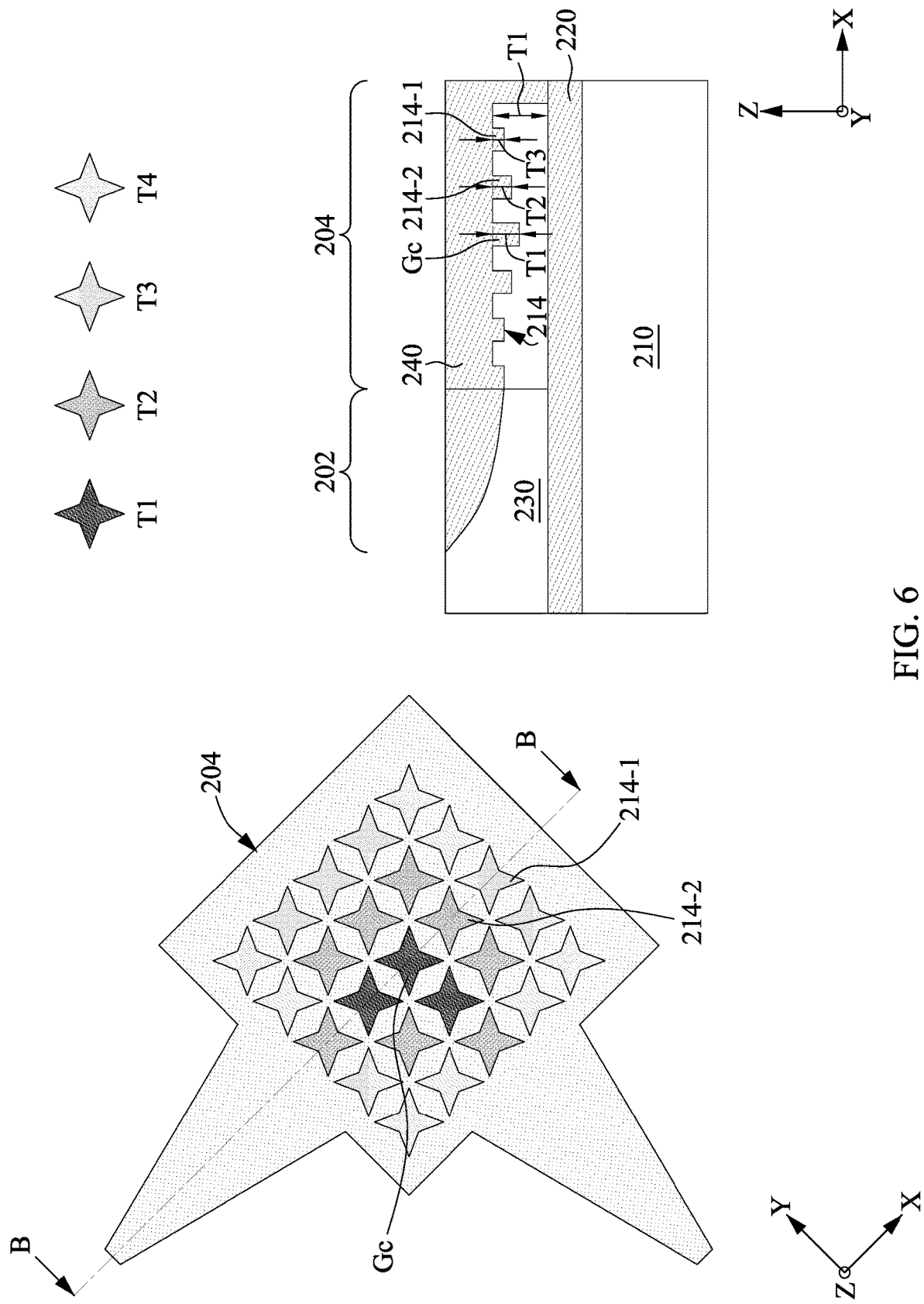
FIG. 6 shows a top view and a cross-sectional view of a grating coupler, in accordance with some embodiments of the present disclosure.

FIG. 6 shows a top view and a cross-sectional view of the grating coupler 100, in accordance with some embodiments of the present disclosure. The cross-sectional view is taken along the sectional line AA of the top view. The gratings 214 may have different depths based on their relative locations in the location map 200 for achieving optimal optical coupling efficiency. According to some embodiments of the present disclosure, the central grating Gc is aligned with the center of the optical fiber 104, and thus receive the highest optical energy. Therefore, the central grating Ge has a highest refraction level. According to some embodiments, the thickness or depth T1 of the central grating Gc is set as substantially one half of the total thickness T of the upper silicon layer 230 of the grating section 204. According to some embodiments, as the remaining gratings 214 are located further away from the central grating Gc, their received optical energies are decreased more. In order to achieve the highest optical coupling efficiency, when the gratings 214 are arranged in the locations corresponding the portions of the optical fiber 104 other than the center of the optical fiber 104, their thicknesses or depths should be decreased appropriately. Referring to FIG. 6, the depths T2, T3 of the gratings 214 are inversely related to their relative distances to the central grating Gc. In other words, a first grating 214-1 whose is more far away from the central grating Gc than a second grating 214-2 would have a thickness or depth T3 less than a thickness or depth T2 of the second grating 214-2. According to some embodiments, the gratings 214 arranged closest to the four corners of the grating section 204 have a lowest thickness or depth. According to some embodiments, each of the gratings 214, including the central grating Gc, has a substantially planar bottom surface.

Figure 7A:
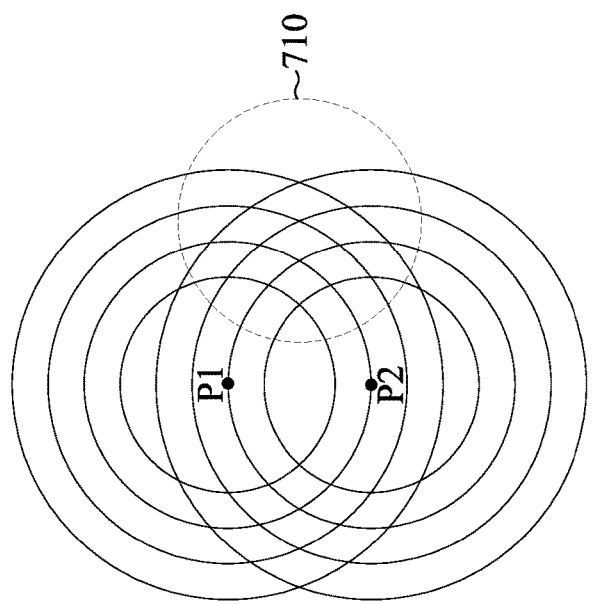
FIGS. 7A, 7B and 7C show a schematic diagram of a location map of the grating of various grating couplers, in accordance with some embodiments of the present disclosure.
Figure 7B:
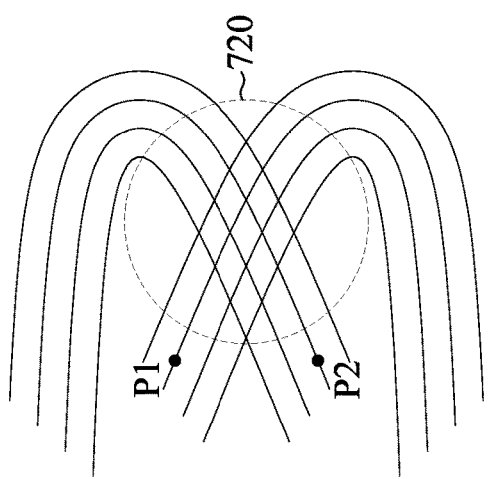
Figure 7C:
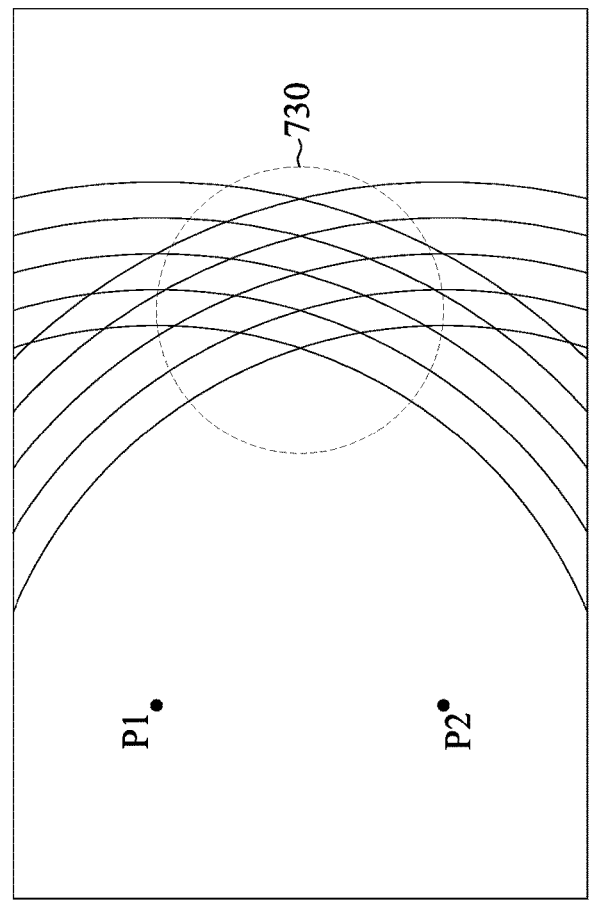

FIGS. 7A, 7B and 7C show schematic diagrams of location maps 700 of the gratings 214 of the grating coupler 100, in accordance with some embodiments of the present disclosure. The location maps 700, including the location maps 700A, 700B and 700C shown in FIG. 7A, FIG. 7B and FIG. 7C, respectively, are similar to the location maps 200 shown in FIG. 2, and the major difference between them lies in that the equations applied in the location maps 700 are different from those for the concentric ellipses. Referring to FIG. 7A, the location maps 700A includes two sets of concentric circles, in which the two set of circles have respective common centers or focal points P1. P2, which serve as the focuses of the light beam of the grating taper 100. A region of the crossing points marked by a dashed circle represents the set of locations for the centers of the gratings 214 (not shown in FIG. 7A).

Similarly, Referring to FIG. 7B, the location maps 700B includes two sets of concentric parabolas, in which the two set of parabolas have respective common focal points P1, P2. A region of the crossing points marked by a dashed circle represents the set of locations for the centers of the gratings 214 (not shown in FIG. 7B).

Similarly, Referring to FIG. 7C, the location maps 700C includes two sets of concentric hyperbolas, in which the two set of hyperbolas have respective common focal points P1, P2. A region of the crossing points marked by a dashed circle represents the set of locations for the centers of the gratings 214 (not shown in FIG. 7C).

Figure 8A:
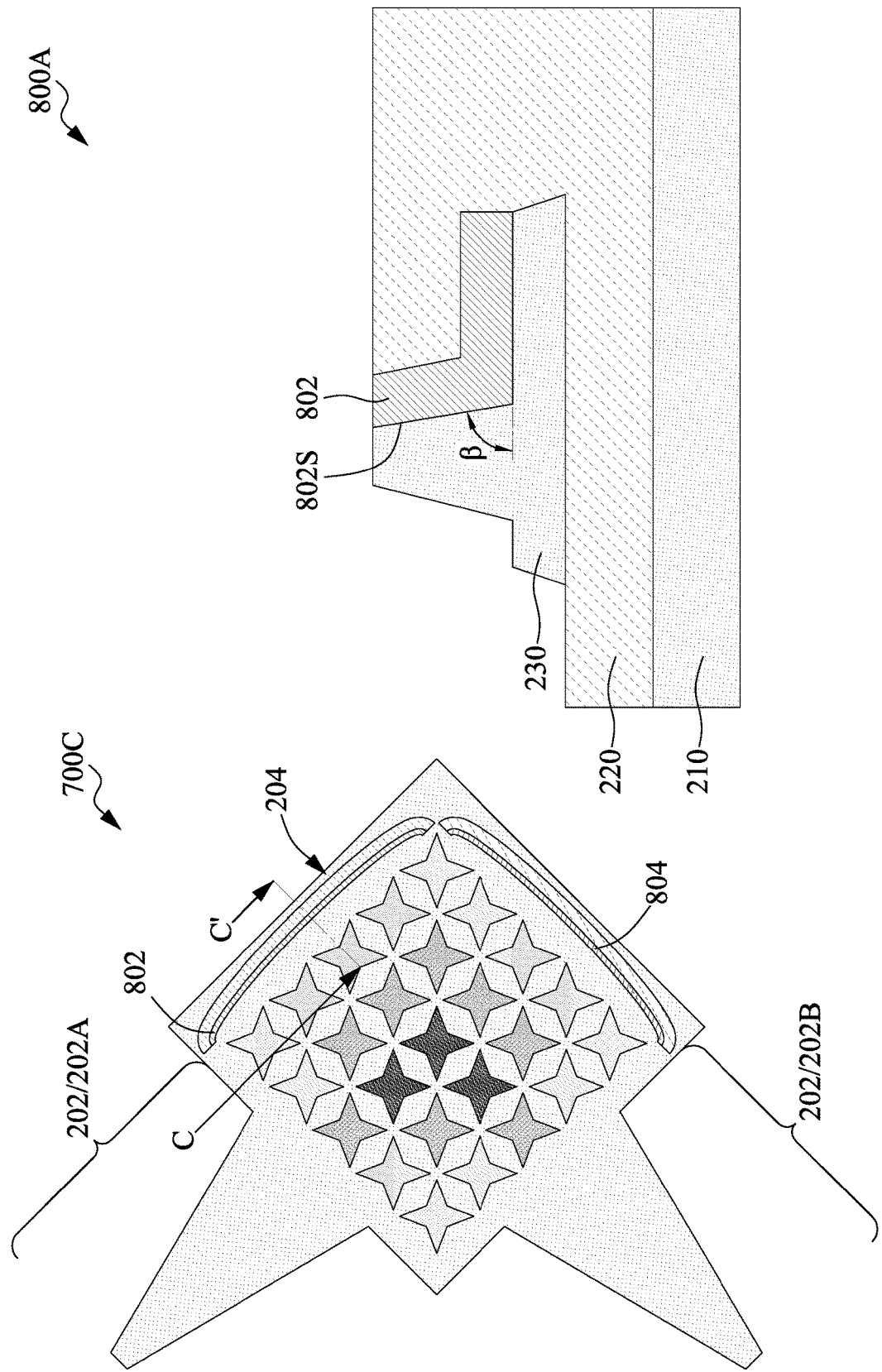
FIG. 8A shows a top view and a cross-sectional view of a grating coupler, in accordance with some embodiments of the present disclosure.

FIG. 8A shows a top view and a cross-sectional view of a grating coupler 800A, in accordance with some embodiments of the present disclosure. The cross-sectional view is taken along the sectional line CC of the top view of the grating coupler 800A. The grating coupler 800A is similar to the grating coupler 100 discussed previously, and these similar features will not be repeated for brevity. The difference of the grating coupler 800A lies in the introduction of reflectors 802 and 804 formed in the grating section 204. Referring to FIG. 1 and FIG. 8A, the reflectors 802, 804 are used to reflect the light beam propagating toward the sides 204C, 204D opposite to the taper section 202. As a result, the light beam incident upon the reflectors 802, 804 can be reflected back to the grating section 204 and propagate into the tapers 202 through refraction of the gratings 214. The optical coupling efficiency may be increased accordingly. The reflectors 802 and 804 may be arranged to form an arc adjacent to the edge gratings 214.

According to some embodiments, the reflectors 802, 804 are formed of a conductive material, such as metal. Example metals for forming the reflectors 802, 804 may include tungsten, titanium, copper, aluminum, or the like. According to some embodiments, as shown in FIG. 8A, the reflector 802 or 804 has a curved shape from a top-view perspective to increase the performance of the collecting and focusing of the reflected light beam. Referring to the cross-sectional view of the grating coupler 800A, the reflector 802 or 804 is deposited on a sidewall of the upper silicon layer 230. Although not illustrated in FIG. 8A, the reflectors 802, 804 are arranged at a same level of the gratings 214 in order to reflect the light beam into the gratings 214 to reinforce refraction of the gratings 214. According to some embodiments, the reflector 802 or 804 has a sidewall 802S including an L-shape formed on an upper surface and a sidewall of the upper silicon layer 230. The reflector 802 or 804 may be laterally surrounded by the upper silicon layer 230 and the cladding layer 240 from two sides of the reflector 802 or 804. The reflector 802 or the sidewall of the upper silicon layer 230 may form an included angle β with a horizontal surface of the upper silicon layer 230, in which the angle β may be less than 90 degrees to help reflect the light beam into the interior of the grating coupler 800A.

Figure 8B:
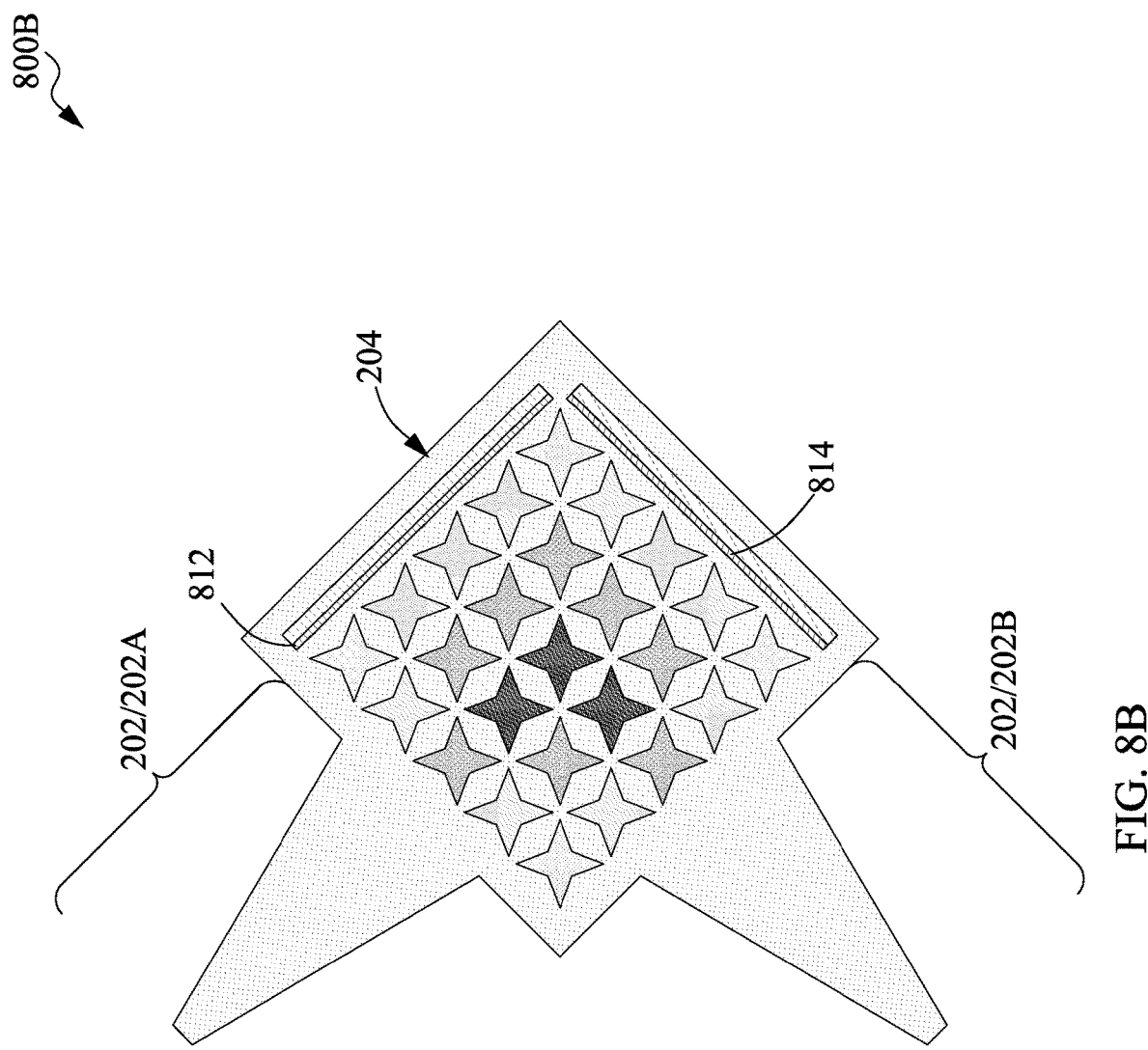
FIGS. 8B and 8C show top views of various grating couplers, in accordance with some embodiments of the present disclosure.
Figure 8C:
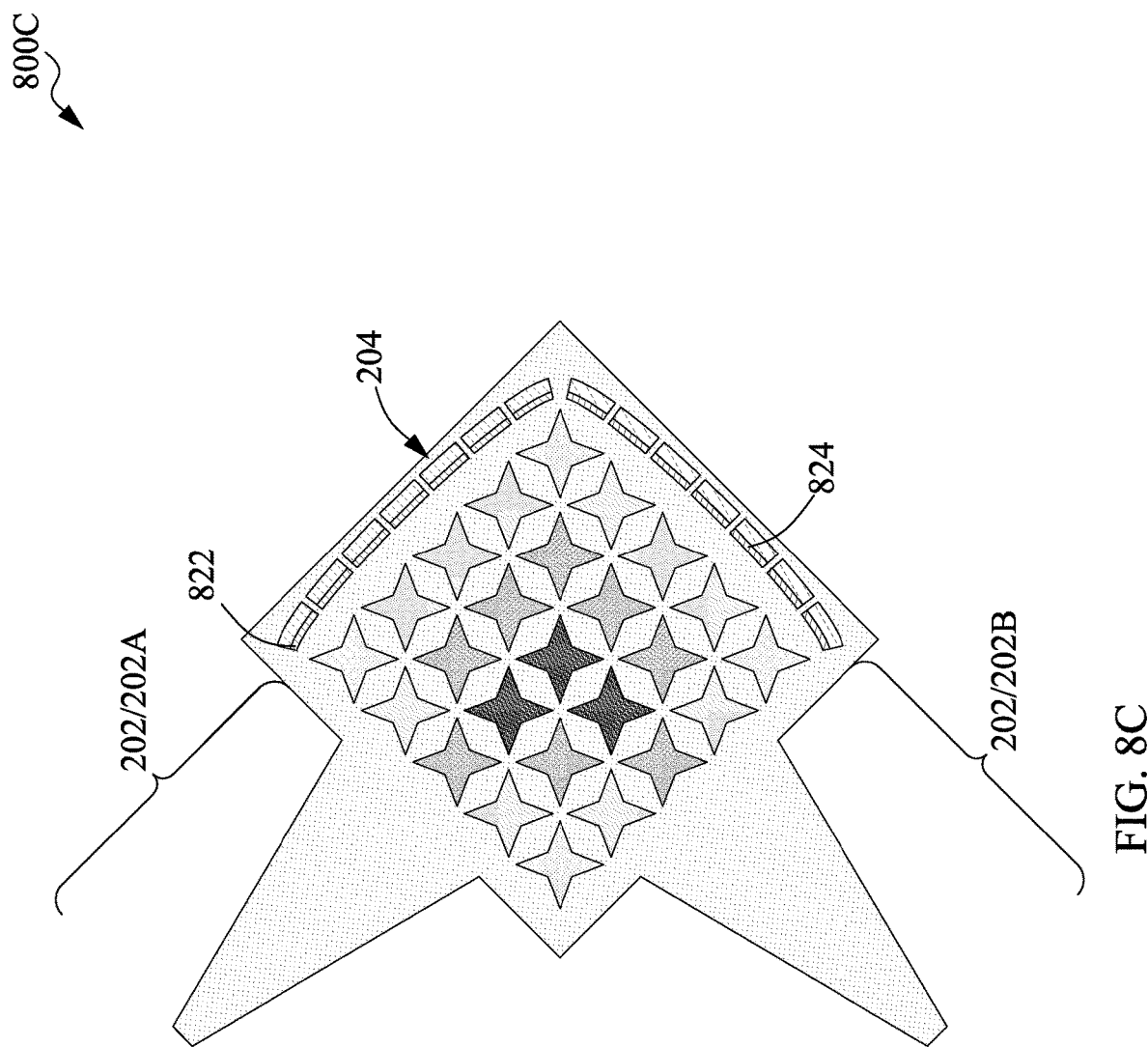

FIGS. 8B and 8C show top views of various grating couplers, in accordance with some embodiments of the present disclosure. The grating couplers 800B, 800C are similar to the grating coupler 100 or 800A shown in FIG. 1 or FIG. 8A, respectively, and these similar features will not be repeated for brevity. The difference between the grating coupler 800B and the grating coupler 800A lies in the arrangement of reflectors 812, 814 formed in the grating section 204. The reflectors 812, 814 each have a straight line shape or a bar shape. The reflectors 812, 814 may be parallel to the adjacent edges of the grating section 204. As a result, the light beam incident upon the reflectors 812, 814 can be reflected back to the grating section 204 and propagate into the tapers 202 through refraction of the gratings 214. The optical coupling efficiency may be increased accordingly. The reflectors 812 and 814 may be arranged to an angle adjacent to the gratings 214. According to some embodiments, the forming of the bar-shaped reflectors 812, 814 is simpler and more reliable than the forming of the arc-shaped reflectors 802, 804.

Referring to FIG. 8C, the difference between the grating coupler 800C and the grating coupler 800A or 800B lies in the arrangement of reflectors 822, 824 formed in the grating section 204. The reflectors 822, 824 are formed of multiple individual reflective blocks arranged in a straight line or a curve. The reflectors 822, 824 may be parallel or non-parallel to the adjacent edges of the grating section 204. Each of the reflective blocks may be in a quadrilateral shape, a circular shape, a polygonal shape, a bar shape, or the like from a top-view perspective. As a result, the light beam incident upon the reflectors 822, 824 can be reflected back to the grating section 204 and propagate into the tapers 202 through refraction of the gratings 214. The optical coupling efficiency may be increased accordingly. The reflective blocks of the reflector 822 or 824 may be arranged spaced apart from each other and form a line, a row, or an arbitrary shape on demand and provides more design and manufacturing flexibility.

Figure 9A:
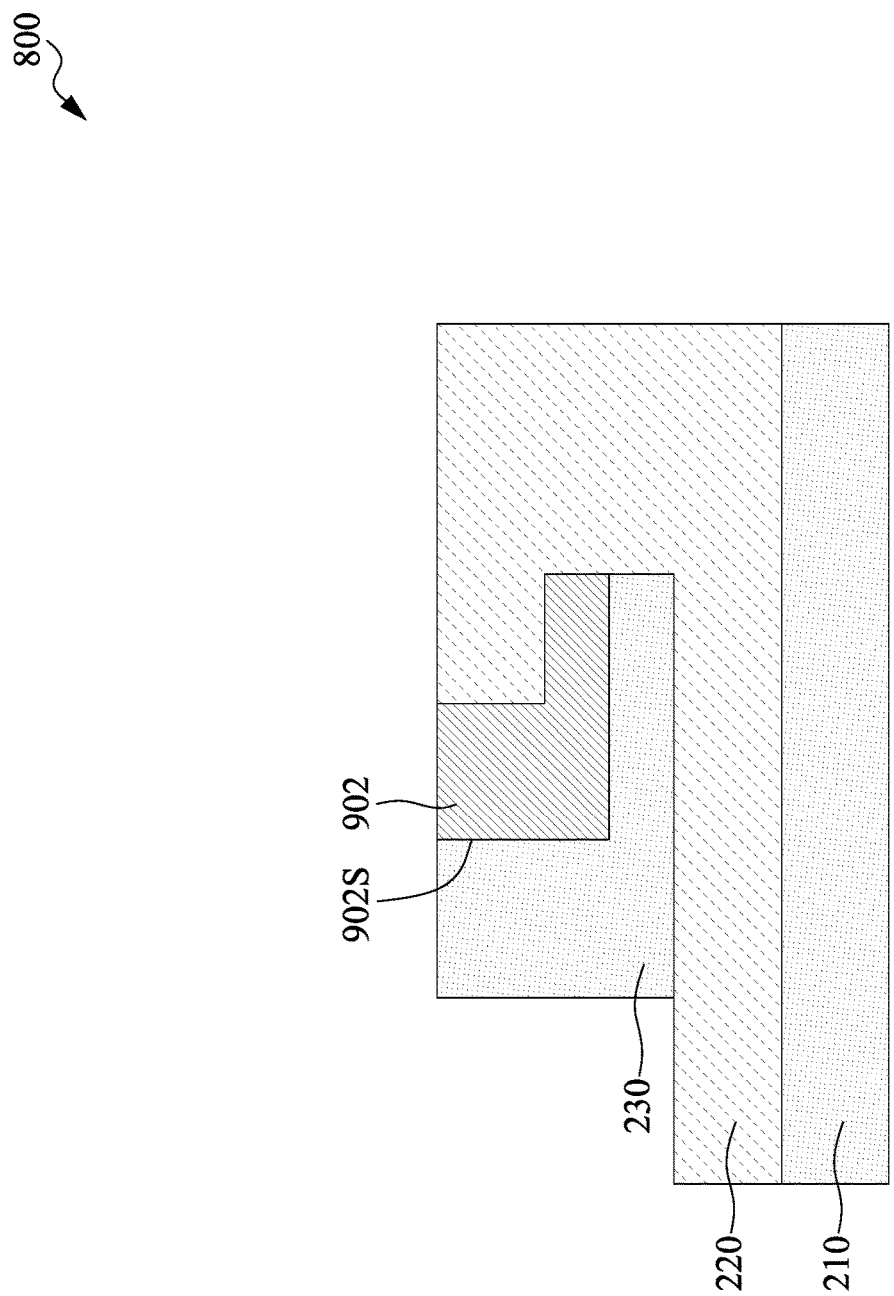
FIGS. 9A, 9B and 9C show cross-sectional views of the grating coupler shown in FIG. 8A, 8B or 8C, in accordance with some embodiments of the present disclosure.
Figure 9B:
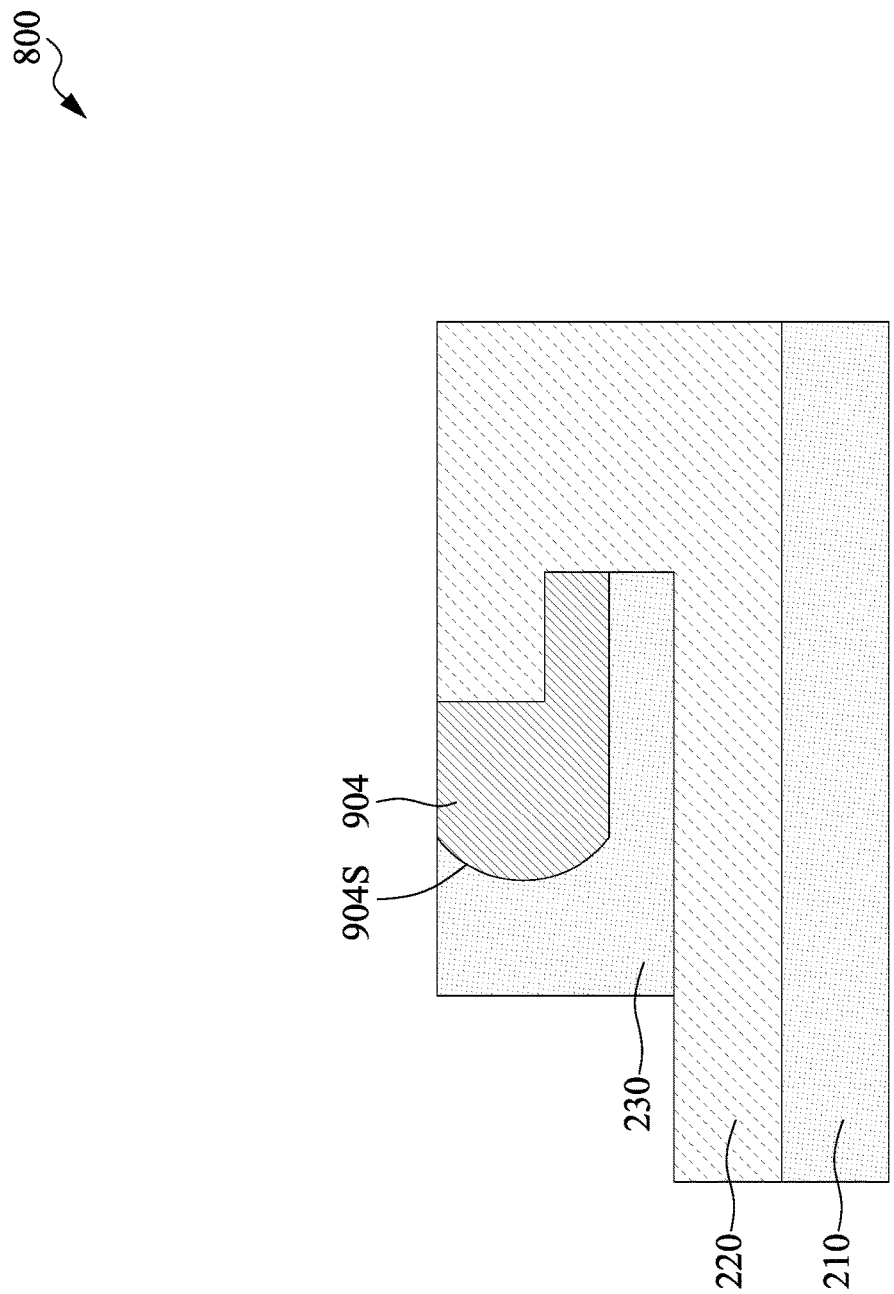
Figure 9C:
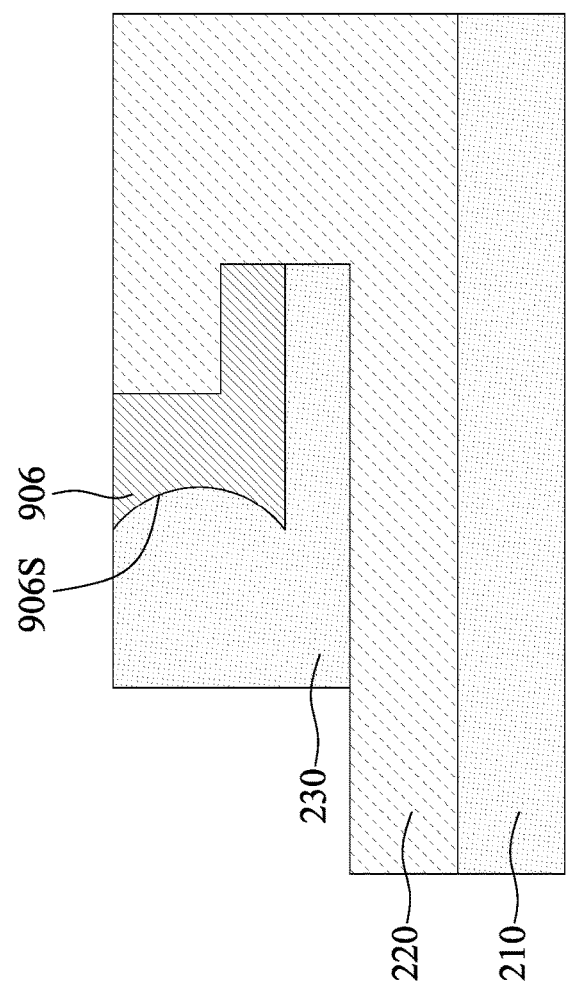

FIGS. 9A, 9B and 9C show cross-sectional views of the grating couplers 800 (including the grating couplers 800A, 800B and 800C) shown in FIG. 8A, 8B or 8C, in accordance with some embodiments of the present disclosure. Referring to FIG. 9A, a reflector 902 is shown, which is similar to the reflectors 802, 804, 812, 814, 822 and 824 discussed previously. The reflector 902 may include a vertical portion having a sidewall 902S facing the upper silicon layer 230 and a horizontal portion arranged over a horizontal portion of the upper silicon layer 230, in which the sidewall 902S of the vertical portion is perpendicular to the horizontal portion. The perpendicular arrangement of the sidewall 902S of the reflector 902 may help reflect the light beam back to the interior of the grating section 204 and increase the optical coupling efficiency.

Referring to FIGS. 9B and 9C, the grating couplers 800 include reflectors 904 and 906 shown with respective sidewalls 904S and 906S. According to some embodiments, the sidewalls 904S and 906S include a curved shape from a cross-sectional view. The sidewall 904S includes a convex shape, while the sidewall 906S includes a concave shape. The curved shapes of the sidewalls 904S, 906S may be configured to guide and focus the reflected light beam toward specific directions in the grating section 214, for improving the light energy collection efficiency.

Figure 10A:
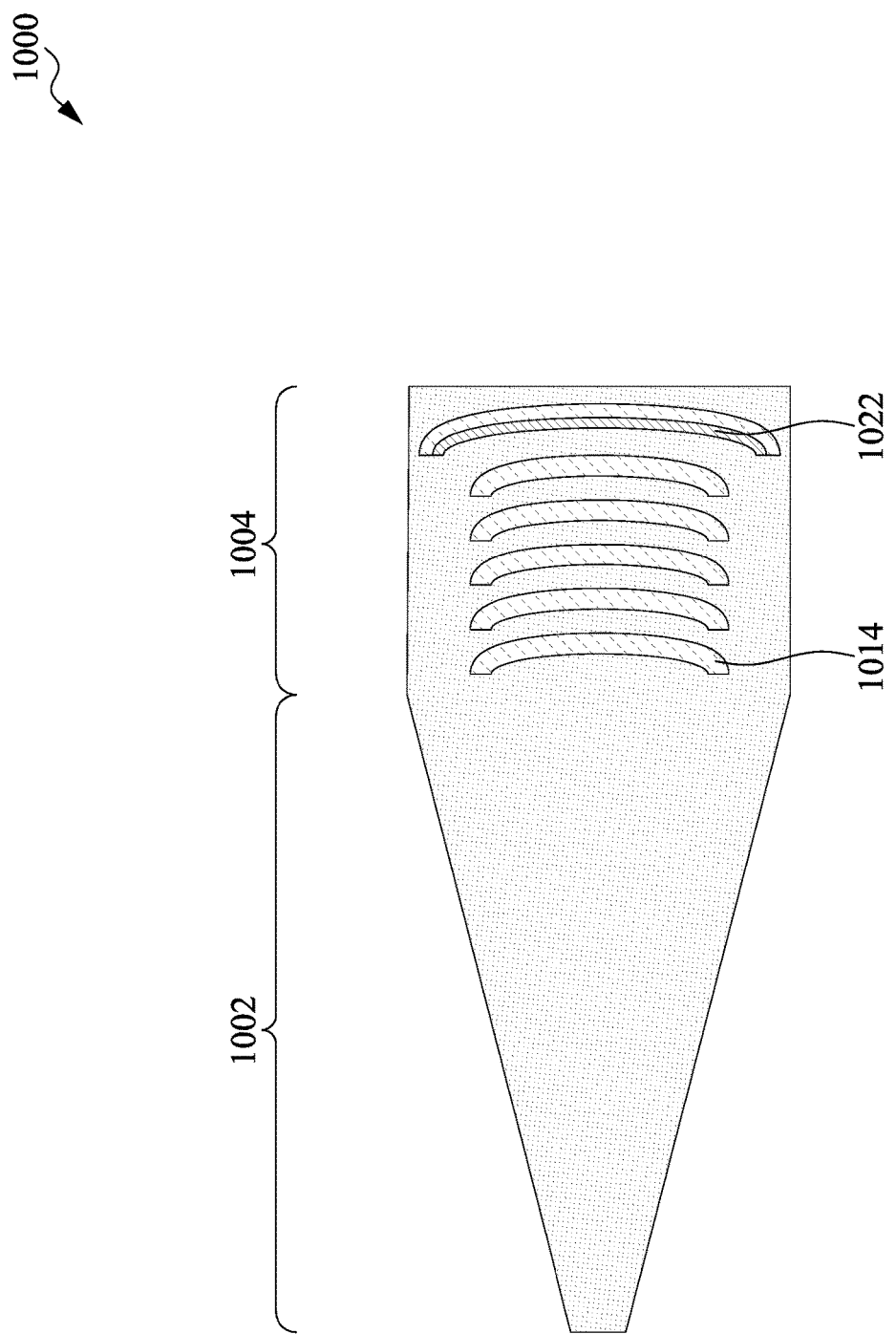
FIGS. 10A, 10B and 10C show top views of a grating coupler, in accordance with some embodiments of the present disclosure.
Figure 10B:
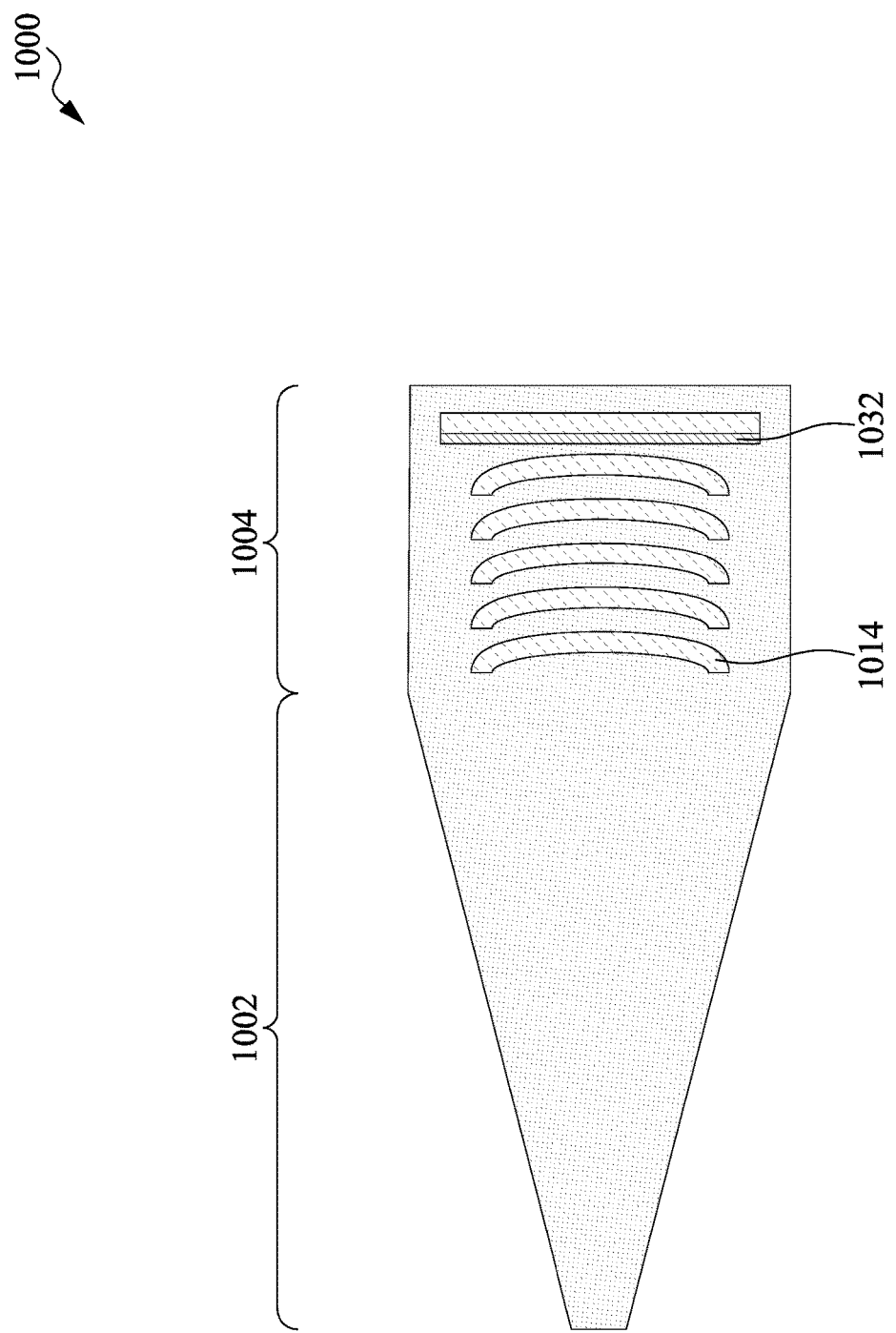
Figure 10C:
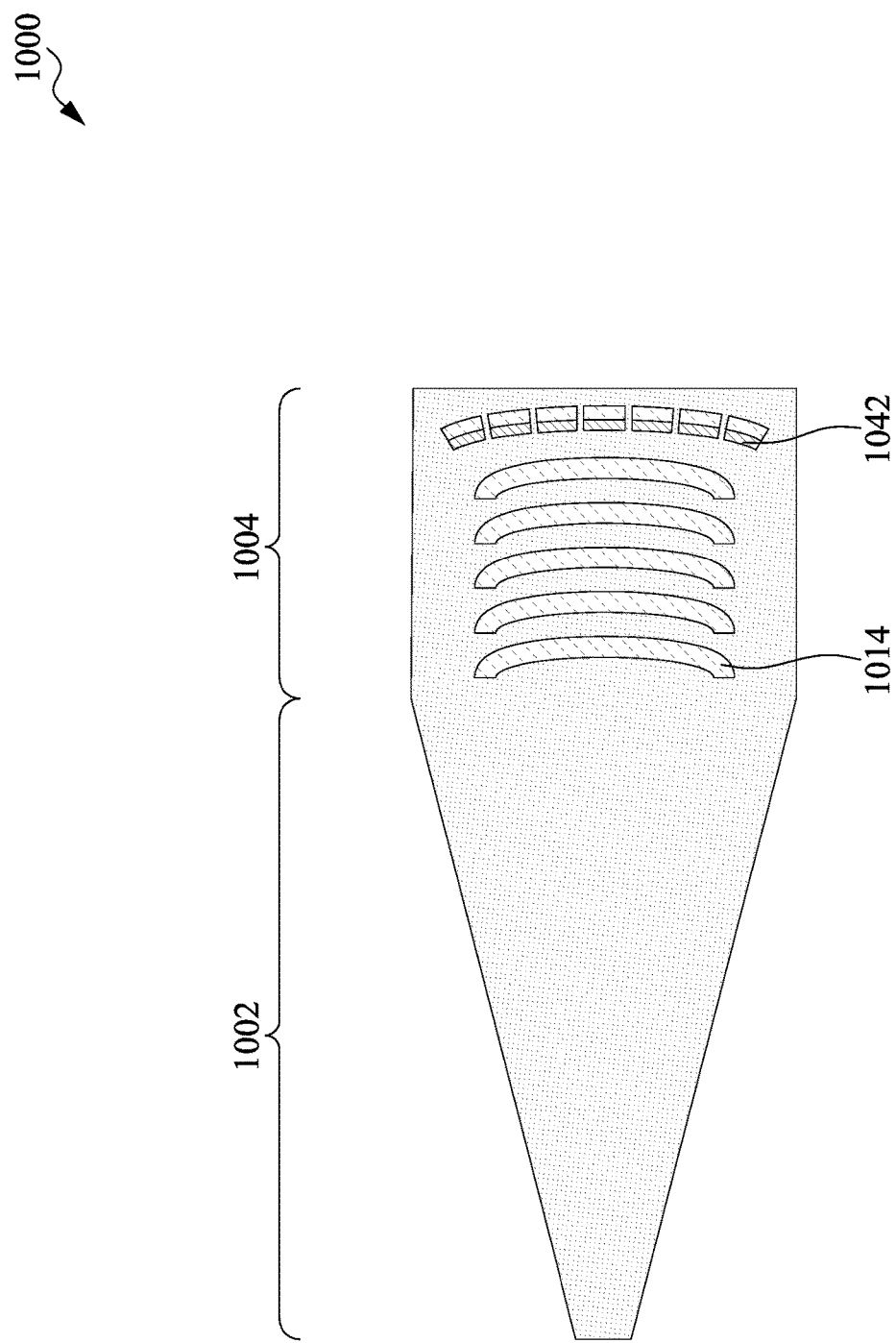

FIGS. 10A, 10B and 10C show top views of grating couplers 1000, in accordance with some embodiments of the present disclosure. The grating couplers 1000 is one-dimensional grating couplers, and are used to couple the light beam between the waveguide 206 and the optical fiber 104 shown in FIG. 1. The grating coupler 1000 is formed of a taper section 1002 and grating section 1004 coupled to the taper section 1002. Different from the two-dimensional grating coupler 100 discussed previously, the grating coupler 1000 generally include a single taper 1002 used to guide a major mode out of the TE mode and the TM mode of the light beam into or from the grating section 1002. Further, the grating section 1002 includes one-dimensional gratings 1014 configured to refract the light beam to or from the taper section 1002. According to some embodiments, the gratings 1014 have a curved shape to increase the focusing effect of the refracted light beam.

According to some embodiments, the grating couplers 1000 further includes reflectors 1022, 1032 and 1042, which correspond to the reflectors 802, 812 and 822, respectively, of the two-dimensional grating couplers 800. The materials, configurations and method of forming of the reflectors 1022, 1032 and 1042 are similar to those of the reflectors 802, 812 and 822, and these similar aspects will not be repeated for brevity. According to some embodiments, the reflectors 1022, 1032 and 1042 can help capture the light beam propagating toward the side of the grating section 1004 opposite the taper section 1002, and reflect such light beam into the grating section 1004 and the taper section 1002. The optical coupling efficiency of the one-dimensional grating couplers 1000 can thus be enhanced.

FIGS. 11A to 11J are cross-sectional views of intermediate stages of a method of forming the grating coupler 100, in accordance with some embodiments of the present disclosure. FIG. 12 is a flowchart of a method 1200 of forming the grating coupler 100, in accordance with some embodiments of the present disclosure. It should be understood that additional steps can be provided before, during, and after the steps shown in FIG. 12, and some of the steps described below can be replaced or eliminated, for additional embodiments of the method 1200. The order of the steps may be changed. Materials, configurations, dimensions, processes and/or operations the same as or similar to those described with respect to the foregoing embodiments may be employed in the following embodiments, and the detailed explanation thereof may be omitted.

Figure 11A:
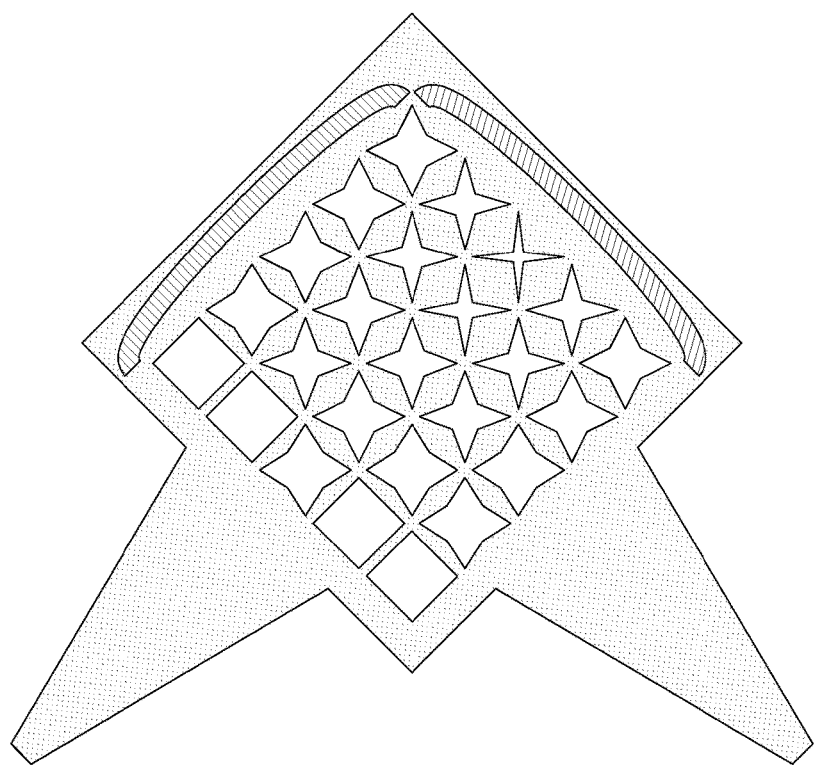
FIGS. 11A to 11J are cross-sectional views of intermediate stages of a method of forming a grating coupler, in accordance with some embodiments of the present disclosure.
Figure 12:
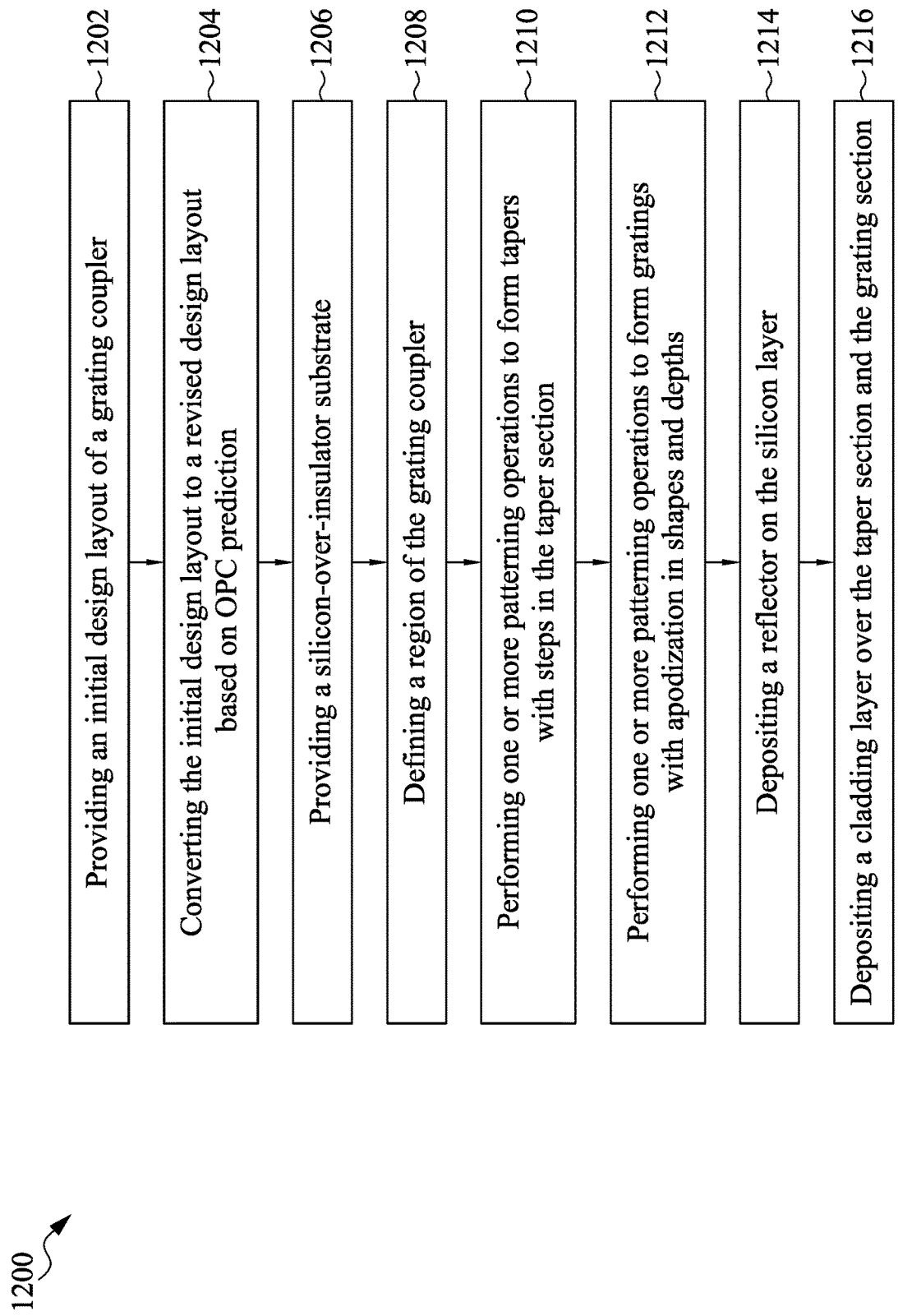
FIG. 12 is a flowchart of a method of forming a grating coupler, in accordance with some embodiments of the present disclosure.

Referring to FIG. 11A, an initial design layout 101A of the grating coupler 100 is provided or received. The respective step corresponds to step 1202 of FIG. 12. The initial design layout 101A may be similar to the top view of the grating coupler 100 shown in FIG. 1, in which the initial design layout 101A does not take into consideration the effect of the lithography errors. The OPC operation has not been performed on the initial design layout 101A.

Figure 11B:
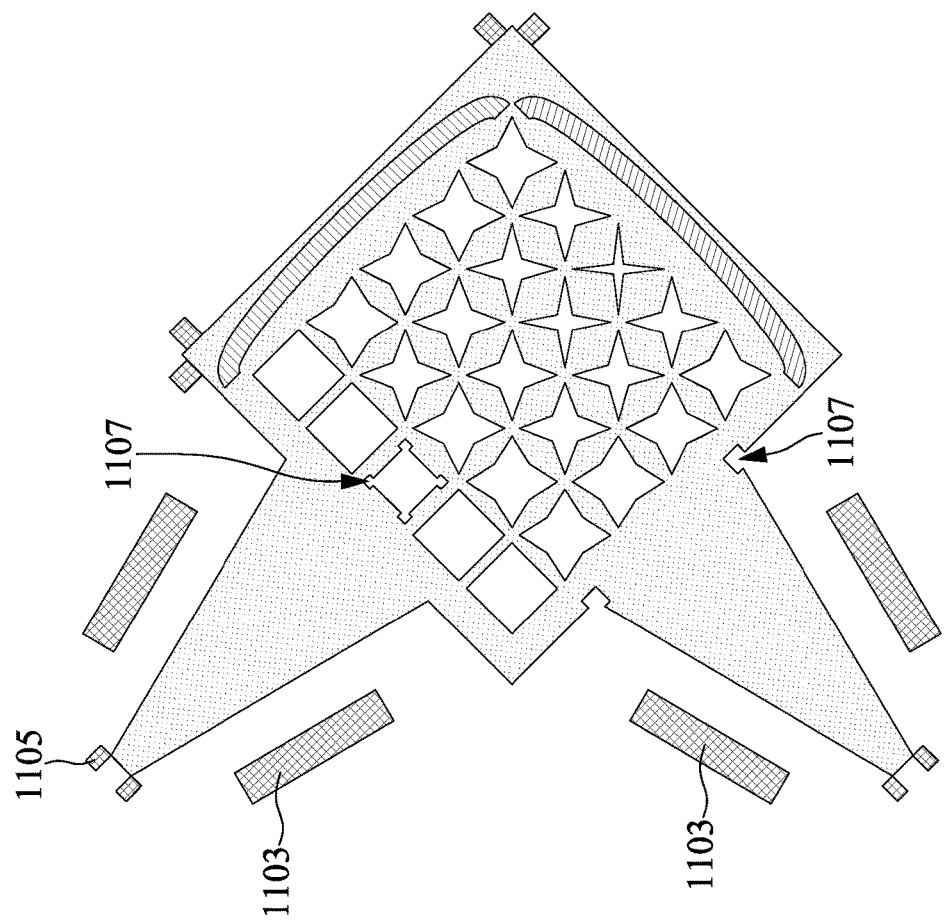

Referring to FIG. 11B, the initial design layout 101A is converted to a revised design layout 101B using OPC operations. The respective step corresponds to step 1204 of FIG. 12. The layout of the fabricated grating coupler 100 would be more similar to initial design layout 101A through the help of the OPC operations. According to some embodiments, sub-resolution assist features, e.g., a scattering bar 1103, are incorporated into the initial design layout 101A. According to some embodiments, the pattern of the grating coupler 100, e.g., the taper 202A, 202B, or the grating section 204, e.g., the edges of the grating section 204 and gratings 214, are modified by a serif or hammerhead 1105, or a mouse-bite 1107.

Figure 11C:
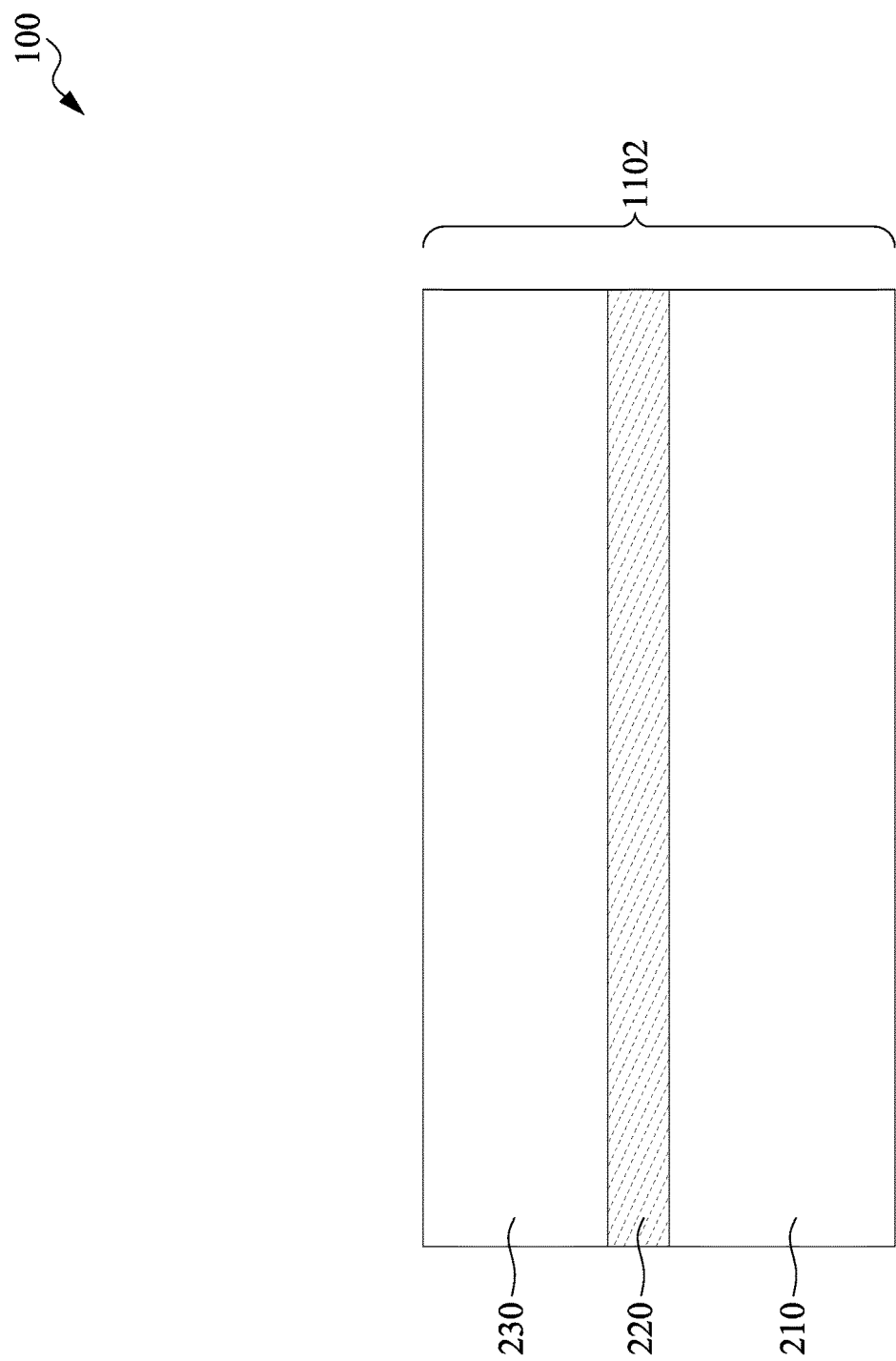

FIGS. 11C to 11J are cross-sectional views of intermediate stages of a method of manufacturing the grating coupler 100 based on the revised design layout 101B, in accordance with some embodiments of the present disclosure. Referring to FIG. 11C, a substrate 1102 is provided, received or formed. The respective step corresponds to step 1206 of FIG. 12. According to some embodiments, the substrate 1102 is a composite substrate, e.g., a silicon-over-insulator (SOI) substrate, and may include a lower silicon layer 210, an insulating layer 220 and a upper silicon layer 230 arranged in a stack. The lower silicon layer 210 may include semiconductor materials, such as silicon, germanium, silicon germanium or other suitable materials. According to some embodiments, the insulating layer 220 includes dielectric materials, such as silicon oxide, silicon nitride, or the like. The upper silicon layer 230 may be an epitaxial silicon layer.

Figure 11D:
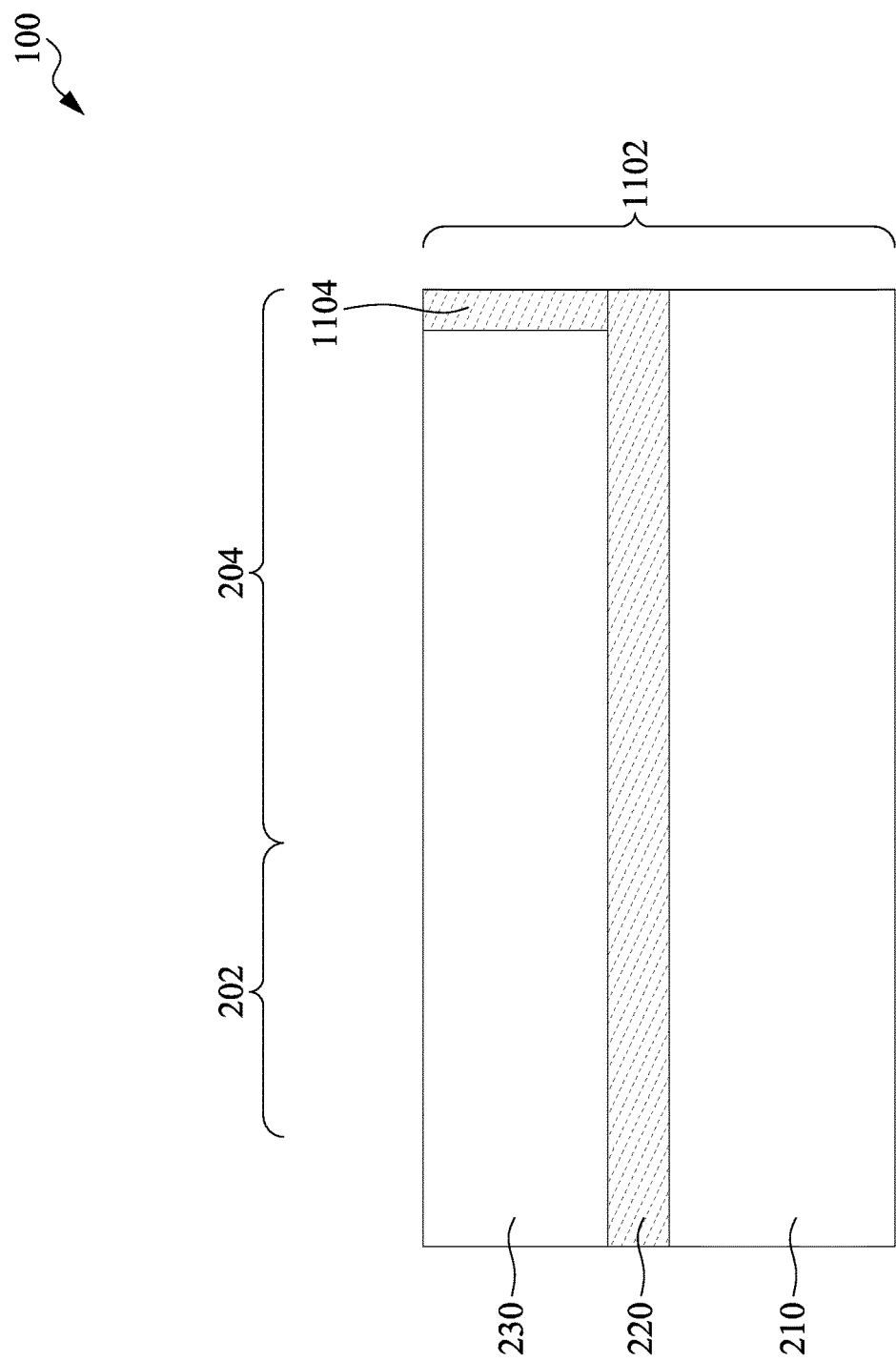

Referring to FIG. 11D, a region of the grating coupler 100 is defined. The respective step corresponds to step 1208 of FIG. 12. According to some embodiments, the region of the grating coupler 100 is formed and laterally surrounded by a cladding layer 240. The grating coupler 100 may further include the taper section 202 and the grating section 204. The cladding layer 240 may extend toward the insulating layer 220. The cladding layer 240 may include silicon oxide, silicon nitride, silicon oxynitride, or other suitable dielectric materials. According to some embodiments, the insulating layer 220 and the cladding layer 240 are formed of the same material.

Figure 11E:
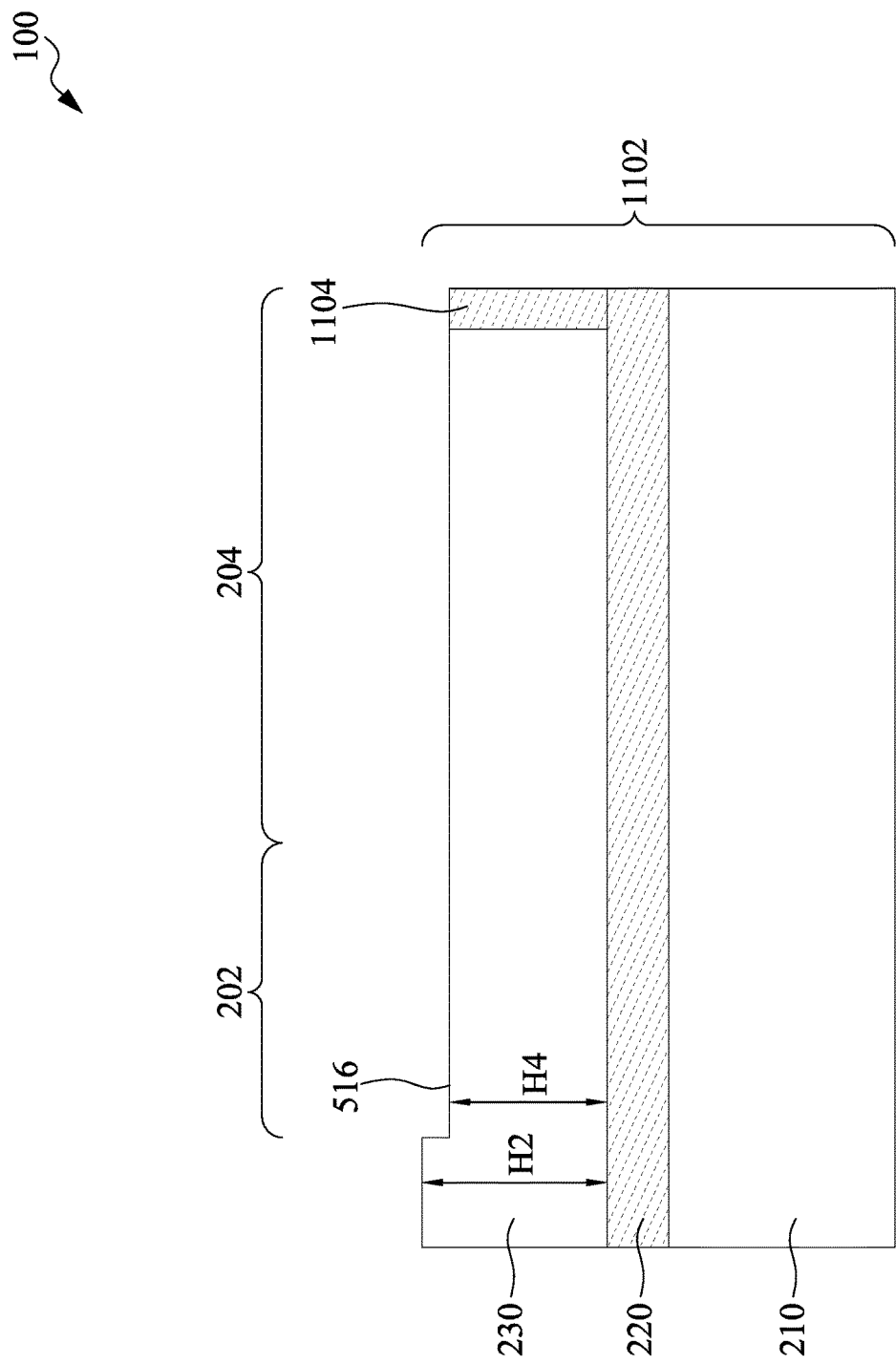
Figure 11F:
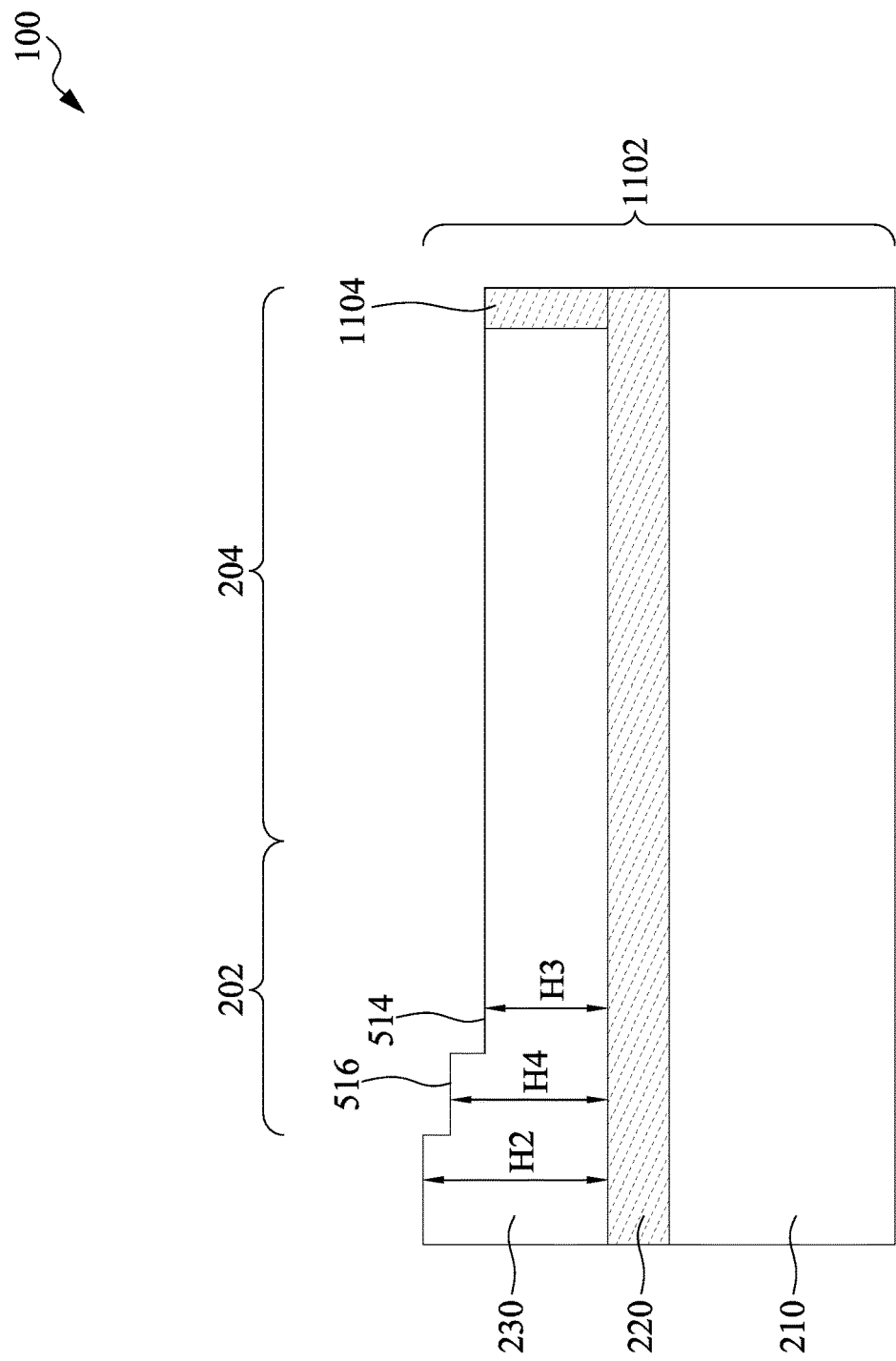
Figure 11G:
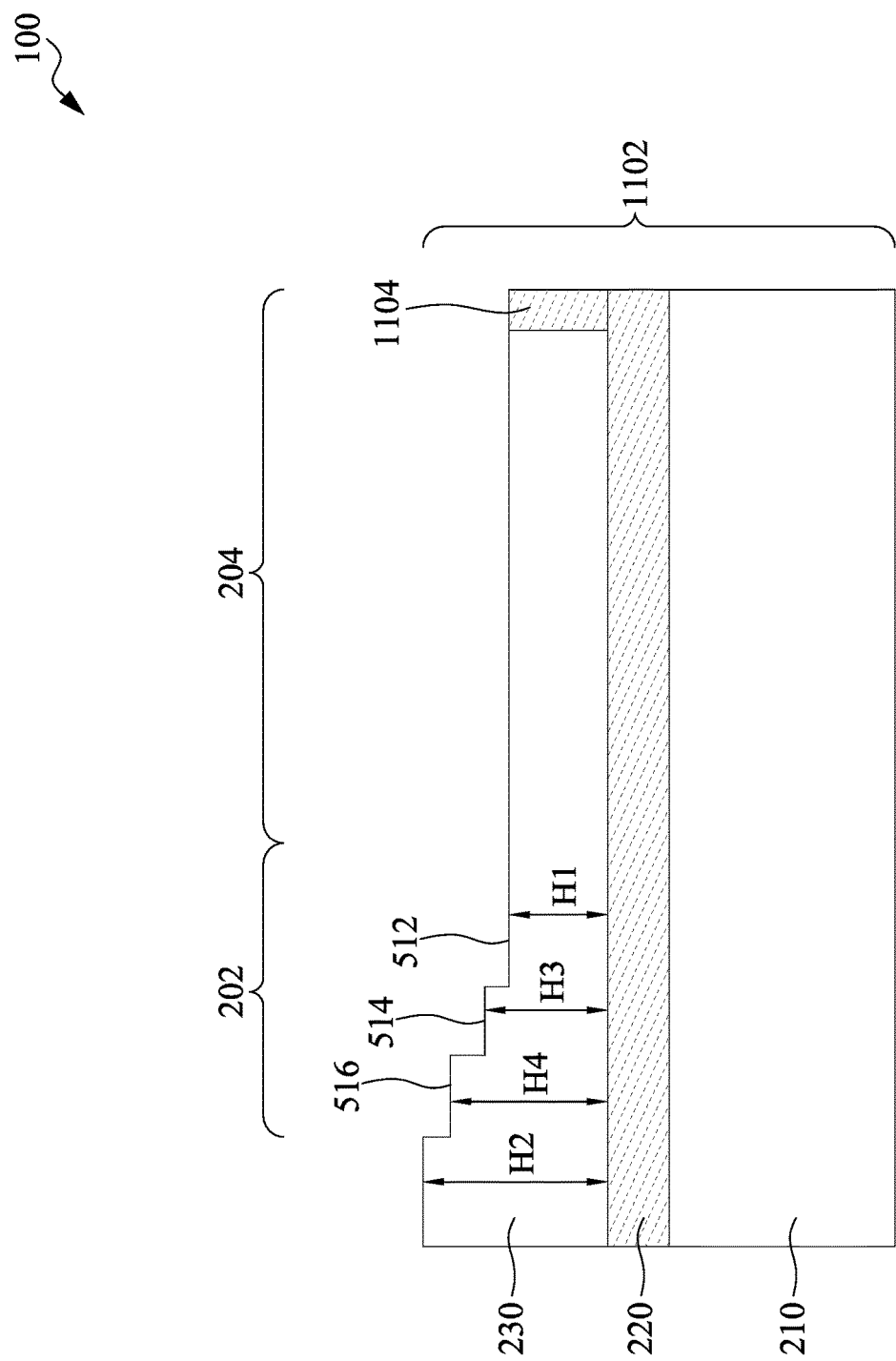

Referring to FIG. 11E to FIG. 11G, one or more patterning operations are performed to form tapers with steps in the taper section 202. For example, a stepped shape of the taper 202A, 202B of the taper section 202 is formed. The respective steps corresponds to step 1210 of FIG. 12. According to some embodiments, the steps 516, 514 and 512 are formed in sequence using photolithography and etching operations. The etching operation may include a wet etch, a dry etch, a combination thereof (e.g., reactive ion etch, RIE), or the like. The steps 516, 514, 512 are etched to include step heights H4, H3 and H1, respectively, as illustrated shown in the subfigure (c) of FIG. 5A. According to some embodiments, the curved shape or the slope shape of the upper surface of the taper section 202 shown in subfigures (a) and (b) of FIG. 5A can be formed with different photolithography and etching operations. According to some embodiments, the slope or the curvature of the upper surface can be controlled by one or more etching and/or epitaxial growth operation. Further, the taper shape of the tapers 202A, 202B, and the contracted sidewalls of the steps 512, 514, 516 from a top-view perspective may be patterned during the patterning of the steps 512, 514 and 516, and the second end 502 of the tapers 202A, 202B, or may be alternatively patterned in separate patterning operations. According to some embodiments, the tapered shapes of the taper section 202 and the quadrilateral shape of the grating section 204 are patterned during the step of defining the grating coupler 100 with reference to FIG. 11D and step 1212 of FIG. 12.

Figure 11H:
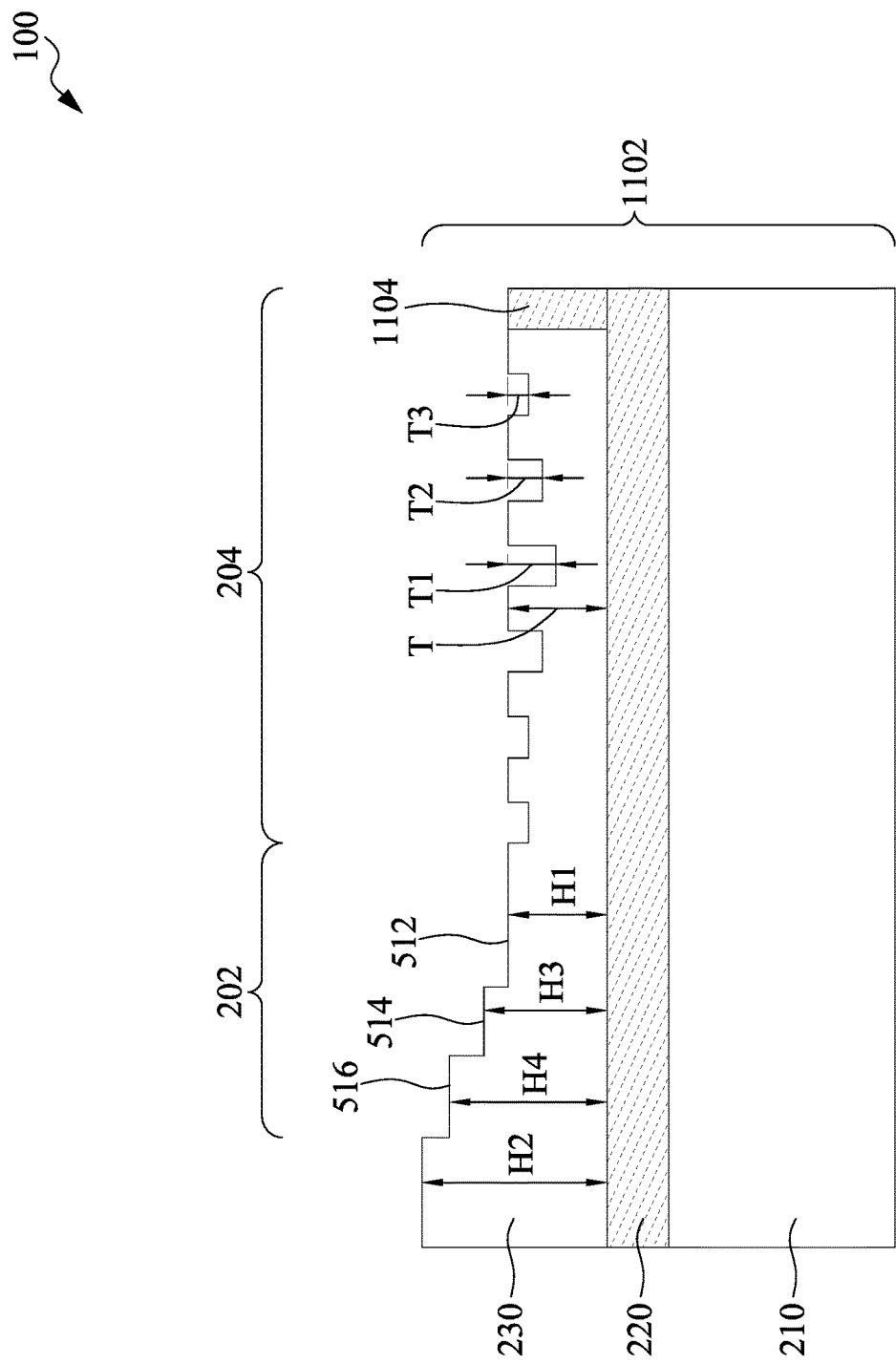

Referring to FIG. 11H, one or more patterning operations are formed to form the gratings 214 with apodization in shapes and depths. The respective step corresponds to step 1214 of FIG. 12. The perimeter of the grating section 204 may be determined and patterned. According to some embodiments, the shapes and depths of the top views of the gratings 214 are patterned according to their locations in the location map 200 or other suitable location maps, e.g., location maps 700A, 700B, 700C. The shapes of the apodized gratings 214 are discussed with reference to FIGS. 1, 2, 3A, 3B, 4A through 4G, 5A and 5B, and the depths of the apodized gratings 214 are discussed with reference to FIG. 6. The patterning operation may include photolithography and etching operations.

Figure 11I:
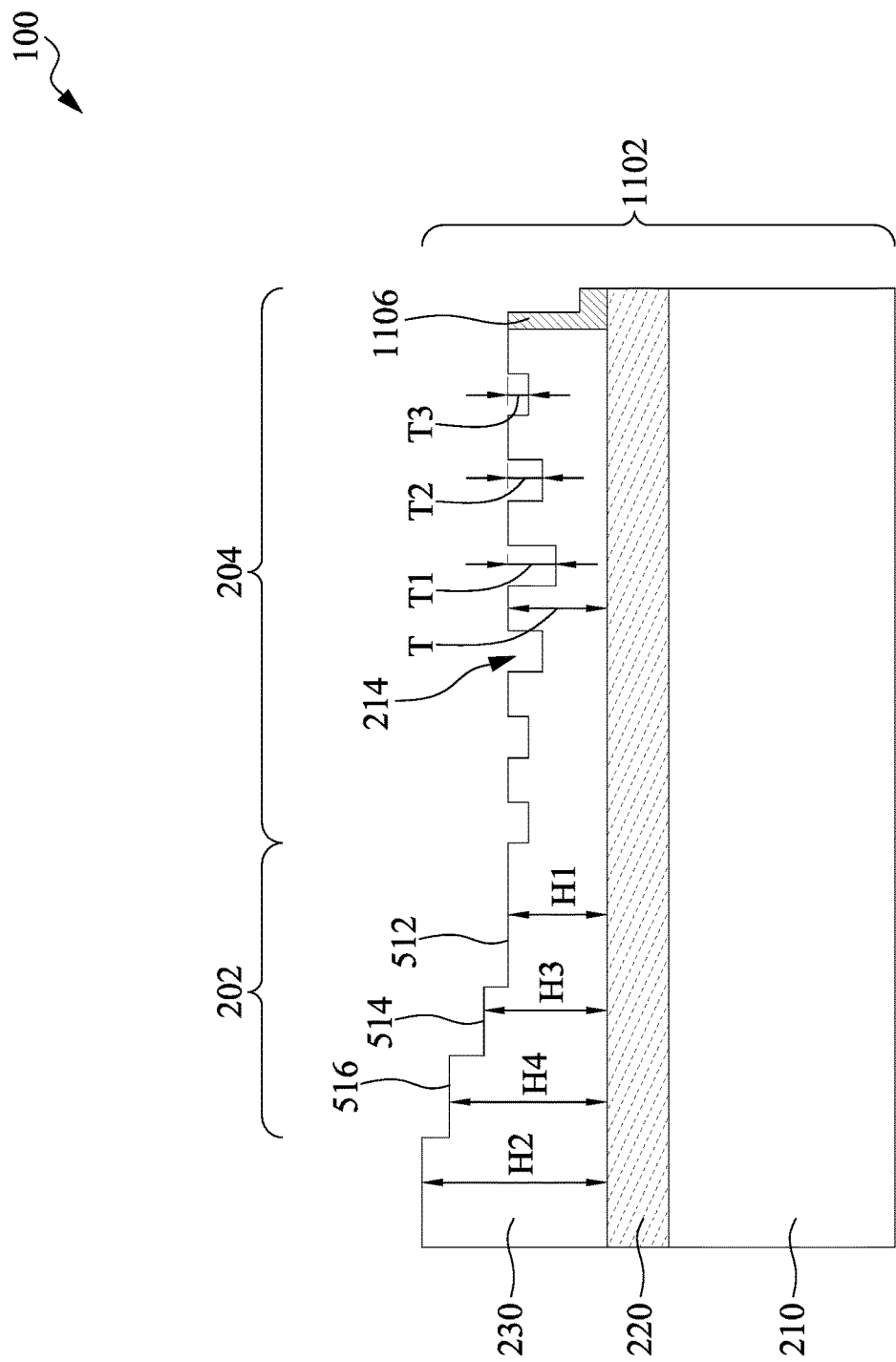

Referring to FIG. 11I, one or more reflectors 1106 are formed on a horizontal surface of the upper silicon layer 230. The reflectors 116 may be similar to the reflectors 802, 804, 812, 814, 822, 824, 902, 904 and 906 discussed with reference to FIGS. 8A through 8C and 9A through 9C. The respective step corresponds to step 1216 of FIG. 12. The reflectors 1106 may be formed by forming a trench in the upper silicon layer 230 or the insulating material 1104, followed by a deposition operation, e.g., physical vapor deposition (PVD), chemical vapor deposition (CVD), atomic layer deposition (ALD), plating, or the like. The reflectors 1106 may include a metallic material, e.g., tungsten, copper, aluminum, titanium, or the like, or a dielectric material, e.g., silicon nitride, that can cause reflection of the light beam. The deposition of the reflectors 1106 can be formed before or after the forming of the gratings 214 or the taper section 202.

Figure 11J:
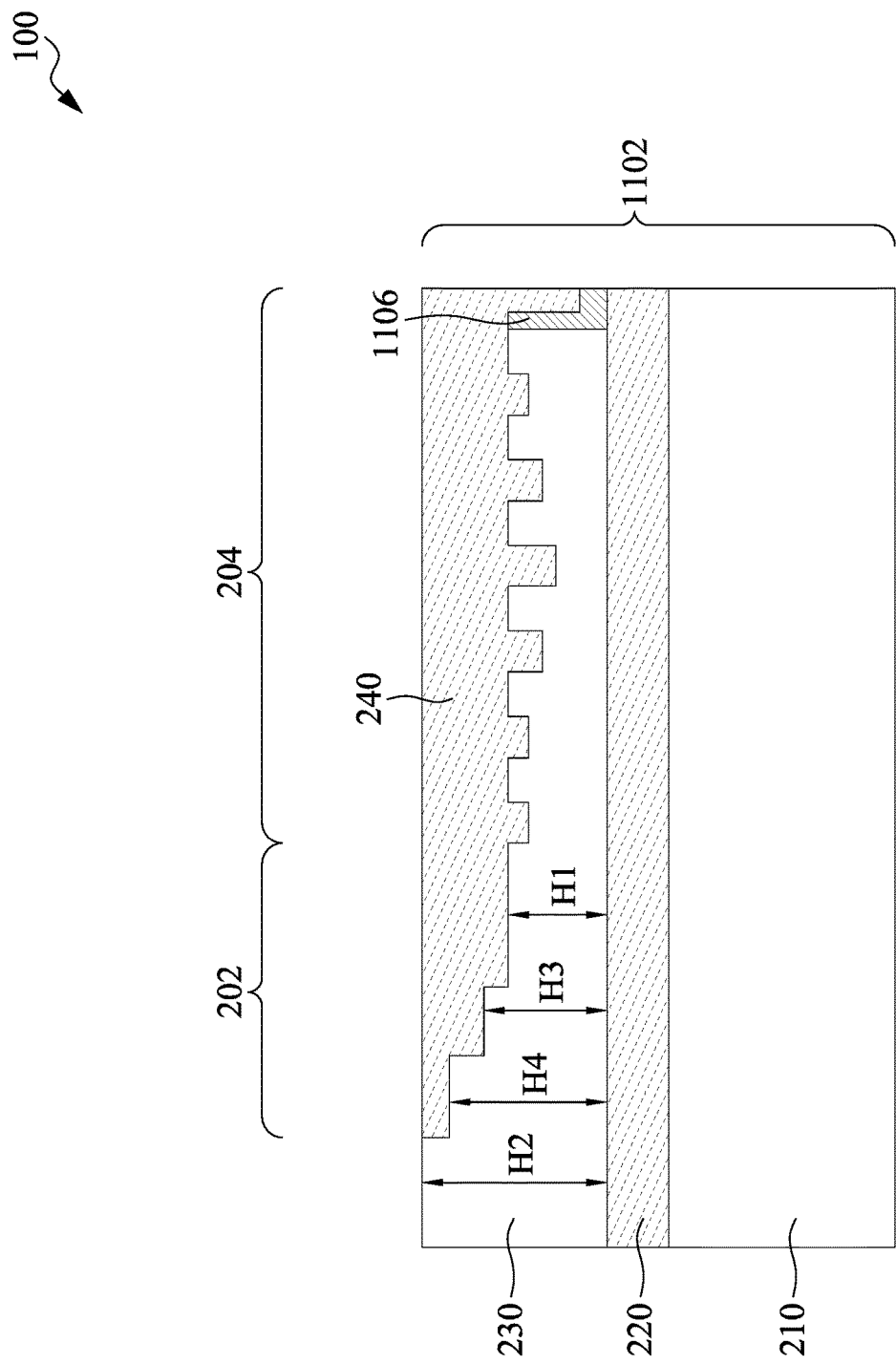

Referring to FIG. 11J, remaining portions of the cladding layer 240 are deposited over the grating coupler 100. The respective step corresponds to step 1212 of FIG. 12. The cladding layer 240 is formed over the taper section 202 and the grating section 204 of the grating coupler 100. The gratings 214 are filled with the cladding layer 240. According to some embodiments, the taper section 202 and the grating section 204 have coplanar upper surfaces.

In accordance with some embodiments of the present disclosure, a method of forming a grating coupler includes: providing an initial design layout of the grating coupler, wherein the initial design layout includes: a taper section, comprising a pair of tapers; and a grating section coupled to the taper section, the grating section having an array of gratings, wherein the gratings includes gradually changing shapes, from a top-view perspective, from a first non-convex octagonal shape of a central grating, at a center of the grating section, to one of a second non-convex octagonal shape, a convex octagonal shape, and a quadrilateral shape, of an edge grating near an edge of the grating section. The method further includes: converting the initial design layout into a revised design layout through an optical proximity correction operation; and manufacturing the grating coupler using the revised design layout.

In accordance with some embodiments of the present disclosure, a method of forming a grating coupler includes: providing a silicon-over-insulator (SOI) substrate; forming a grating section and a pair of tapers in a silicon layer of the SOI substrate, wherein each of the pair of tapers from a first end to a second end; and depositing an insulating material to cover the grating section and the pair of tapers. The grating section includes an array of gratings, wherein the gratings includes gradually changing shapes from a top-view perspective, wherein a central grating includes a first non-convex octagonal shape, a first edge grating includes a second non-convex octagonal shape different from the first non-convex octagonal shape, and a second edge grating, arranged near an interface between the grating section and the taper section, includes a quadrilateral shape.

In accordance with some embodiments of the present disclosure, a grating coupler includes: a taper section, comprising a pair of tapers configured to transmit light of different polarizations; and a grating section configured to be optically coupled to an optical fiber. The grating section includes an array of gratings, and a difference degree in a shape, an area and a thickness between a central grating of the gratings and a first grating other than the central grating is determined according to a distance between the central grating and the first grating. The central grating includes a first non-convex octagonal shape, a first edge grating includes a second non-convex octagonal shape different from the first non-convex octagonal shape, and a second edge grating, arranged near an interface between the grating section and the taper section, includes a convex octagonal or quadrilateral shape.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a grating coupler, comprising:
providing an initial design layout of the grating coupler, wherein the initial design layout comprises:
a taper section, comprising a pair of tapers; and
a grating section coupled to the taper section, the grating section comprising an array of gratings, wherein the gratings includes gradually changing shapes, from a top-view perspective, from a first non-convex octagonal shape of a central grating, at a center of the grating section, to one of a second non-convex octagonal shape, a convex octagonal shape, and a quadrilateral shape, of an edge grating near an edge of the grating section;
converting the initial design layout into a revised design layout through an optical proximity correction operation; and
manufacturing the grating coupler using the revised design layout.

2. The method of claim 1, wherein the non-convex octagonal shape includes four protrusions and four tips, wherein each of the four protrusions extend from a center of the non-convex octagonal shape, and each of the four protrusions is tapered from the center of the non-convex octagonal shape to a tip of the protrusion.

3. The method of claim 1, wherein gratings include gradually decreased surface areas from the center grating to the edge grating.

4. The method of claim 1, wherein the gratings include gradually decreased depths from the central grating to the edge grating.

5. The method of claim 1, wherein each pair of the gratings are spaced apart by different spacing values from the central grating to the edge grating.

6. The method of claim 1, wherein the quadrilateral shape is a square shape.

7. The method of claim 1, wherein the each of the gratings has a substantially planar surface at a bottom of each of the gratings.

8. The method of claim 1, wherein each of the pair of tapers includes a first height at a first end coupled to the grating section and a second end opposite the first end, wherein the first end has a first height less than a second height of the second end.

9. The method of claim 8, wherein each of the pair of tapers includes an upper surface with multiple steps from the first end to the second end.

10. The method of claim 9, wherein the multiple steps have contracted sidewalls from sidewalls of the tapers, wherein the contracted sidewalls tapers from the first end to the second end.

11. The method of claim 1, further comprising a reflector arranged on a side of the grating section opposite to the taper section and configured to reflect a light beam back to the grating section.

12. The method of claim 11, wherein the reflector comprises a row of reflective blocks spaced apart from each other.

13. A method of forming a grating coupler, comprising:
providing a silicon-over-insulator (SOI) substrate;
forming a grating section and a pair of tapers in a silicon layer of the SOI substrate, wherein each of the pair of tapers from a first end to a second end; and
depositing an insulating material to cover the grating section and the pair of tapers,
wherein the grating section comprises an array of gratings, wherein the gratings includes gradually changing shapes from a top-view perspective, wherein a central grating includes a first non-convex octagonal shape, a first edge grating includes a second non-convex octagonal shape different from the first non-convex octagonal shape, and a second edge grating, arranged near an interface between the grating section and the taper section, includes a quadrilateral shape.

14. The method of claim 13, wherein the gratings have decreasing thicknesses from the center grating to the first and second edge gratings.

15. The method of claim 14, wherein the gratings at corners of the grating section have lowest thicknesses.

16. The method of claim 13, wherein the gratings are filled with the insulating material.

17. The method of claim 13, wherein centers of the gratings are coincided with crossing points of two sets of concentric ellipses, wherein the two sets of concentric ellipses comply with a law of optical refraction, and each of the two sets of the concentric ellipses include a common focal point coincided with the second end of each of the pair of tapers.

18. A grating coupler, comprising:
   a taper section, comprising a pair of tapers configured to transmit light of different polarizations; and
   a grating section configured to be optically coupled to an optical fiber, wherein the grating section comprises an array of gratings,
   wherein a difference degree in a shape, an area and a thickness between a central grating of the gratings and a first grating other than the central grating is determined according to a distance between the central grating and the first grating,
   wherein the central grating includes a first non-convex octagonal shape, a first edge grating includes a second non-convex octagonal shape different from the first non-convex octagonal shape, and a second edge grating, arranged near an interface between the grating section and the taper section, includes a convex octagonal or quadrilateral shape.

19. The grating coupler of claim 18, wherein each pair of the gratings are spaced apart by different spacing values from the central grating to the first or second edge grating.

20. The grating coupler of claim 18, wherein each of the tapers has increasing heights from the first end coupled to the second end.

* * * * *